(12) United States Patent
Ballard et al.

(10) Patent No.: US 11,958,177 B2
(45) Date of Patent: Apr. 16, 2024

(54) HYDRAULIC PISTON PUMP FOR A HYDRAULIC TOOL

(71) Applicant: Milwaukee Electric Tool Corporation, Brookfield, WI (US)

(72) Inventors: James G. Ballard, Waukesha, WI (US); Timothy Radtke, New Berlin, WI (US); Daniel Garces, Waukesha, WI (US); Ian C. Zimmermann, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 1126 days.

(21) Appl. No.: 16/565,381

(22) Filed: Sep. 9, 2019

(65) Prior Publication Data

US 2020/0001446 A1 Jan. 2, 2020
US 2023/0093786 A9 Mar. 23, 2023

Related U.S. Application Data

(60) Provisional application No. 62/728,157, filed on Sep. 7, 2018.

(51) Int. Cl.
*B25F 5/00* (2006.01)
*F04B 1/34* (2006.01)
(Continued)

(52) U.S. Cl.
CPC ............... *B25F 5/005* (2013.01); *F04B 1/34* (2013.01); *F04B 7/0038* (2013.01); *F04B 7/02* (2013.01);
(Continued)

(58) Field of Classification Search
CPC ..... H04W 36/00–36/385; H04W 4/70; H04W 4/029; H04W 4/80; H04W 8/186; H04W 12/50; H04W 36/18; H04W 36/305; H04W 36/10; H04W 36/08; H04W 36/14; H04W 36/16; H04W 36/24; H04W 36/30; H04W 36/38; B21B 39/048; B25B 27/10;
(Continued)

(56) References Cited

U.S. PATENT DOCUMENTS 2,768,550 A 10/1956 Ingwer et al.
3,433,415 A 3/1969 Enssle
(Continued)

FOREIGN PATENT DOCUMENTS

EP 2055942 A1 * 6/2009

*Primary Examiner* — Bryan M Lettman
(74) *Attorney, Agent, or Firm* — Quarles & Brady LLP

(57) ABSTRACT

A hydraulic pump includes a work port, a high-flow piston, multiple high-pressure pistons, and an unloading valve. The work port couples to a fluid supply line of a hydraulic tool. The high-flow piston supplies fluid along a first flow path to the work port. The high-pressure pistons supply fluid along a second flow path to the work port. The unloading valve is fluidly coupled to the first flow path and the second flow path, and actuatable between an open state and a closed state. The unloading valve is configured to (i) permit fluid to flow from the high-flow piston to the work port in the open state, (ii) inhibit fluid from flowing from the high-flow piston to the work port in the closed state, and (iii) actuate from the open state to the closed state when a pressure of the fluid in the second flow path exceeds a threshold pressure.

8 Claims, 18 Drawing Sheets

(51) Int. Cl.

| | |
|---|---|
| *F04B 7/00* | (2006.01) |
| *F04B 7/02* | (2006.01) |
| *F04B 9/04* | (2006.01) |
| *F04B 17/03* | (2006.01) |
| *F04B 23/06* | (2006.01) |
| *F04B 49/03* | (2006.01) |
| *F04B 49/06* | (2006.01) |
| *F04B 49/08* | (2006.01) |
| *F04B 49/22* | (2006.01) |
| *H04W 36/30* | (2009.01) |

(52) U.S. Cl.
CPC .............. *F04B 9/042* (2013.01); *F04B 17/03* (2013.01); *F04B 23/06* (2013.01); *F04B 49/03* (2013.01); *F04B 49/06* (2013.01); *F04B 49/08* (2013.01); *F04B 49/22* (2013.01); *H04W 36/305* (2018.08); *F04B 2201/06* (2013.01); *F04B 2205/16* (2013.01)

(58) Field of Classification Search
CPC ......... F15B 2211/505; F15B 221/5158; H04N 21/42221; H04N 21/43637; H04N 21/4307; F04B 49/06; F04B 9/042; F04B 1/04–1/34; F04B 7/0038; F04B 7/02; F04B 17/03; F04B 2201/06; F04B 2205/16; F04B 49/03; F04B 49/08; F04B 49/22; F04B 7/0019–7/0034; F04B 7/0233–7/0258; F04B 23/06; F04B 23/04; F04B 41/06; F04B 49/02; B25F 5/005; F16K 17/04; G05D 16/10
USPC ....... 72/453.01, 453.02, 453.06; 60/325–494
See application file for complete search history.

(56) References Cited

U.S. PATENT DOCUMENTS

| | | | |
|---|---|---|---|
| 3,791,766 A | 2/1974 | Kikutsugi | |
| 4,211,080 A | 7/1980 | White | |
| 4,218,885 A | 8/1980 | White | |
| 4,218,886 A | 8/1980 | White | |
| 4,623,124 A | 11/1986 | Lewis | |
| 4,689,957 A | 9/1987 | Gallentine | |
| 5,125,158 A | 6/1992 | Casebolt et al. | |
| 5,243,761 A | 9/1993 | Sullivan et al. | |
| 5,355,676 A | 10/1994 | Inokuchi | |
| 5,464,330 A * | 11/1995 | Prince | F04B 11/0033 417/245 |
| 5,678,982 A | 10/1997 | Schwaiger | |
| 5,687,567 A | 11/1997 | Hansson | |
| 5,711,078 A | 1/1998 | Patton et al. | |
| 5,711,354 A | 1/1998 | Siegele et al. | |
| 6,029,448 A | 2/2000 | Hobson | |
| 6,092,290 A | 7/2000 | Vogelsanger | |
| 6,283,732 B1 | 9/2001 | Reinartz | |
| 6,524,084 B2 | 2/2003 | Neumair | |
| 6,578,357 B1 | 6/2003 | Schmollngruber | |
| 6,589,029 B1 | 7/2003 | Heller | |
| 6,634,173 B2 | 10/2003 | Linster et al. | |
| 6,688,834 B1 | 2/2004 | Aulick | |
| 6,863,502 B2 * | 3/2005 | Bishop | F04B 23/103 417/42 |
| 6,942,468 B2 | 9/2005 | Sauerbier et al. | |
| 7,182,583 B2 | 2/2007 | Gandrud et al. | |
| 7,281,372 B2 | 10/2007 | Sakai et al. | |
| 7,448,858 B2 | 11/2008 | Neumair et al. | |
| 7,555,978 B2 | 7/2009 | Hiez et al. | |
| 7,621,123 B2 | 11/2009 | Jacobs et al. | |
| 7,861,537 B2 | 1/2011 | Givens | |
| 7,926,407 B1 | 4/2011 | Hallissy et al. | |
| 8,220,380 B2 | 7/2012 | Andres et al. | |
| 8,235,689 B2 | 8/2012 | Ciavarella et al. | |
| D669,918 S | 10/2012 | Hughes | |
| 8,303,262 B1 * | 11/2012 | Hawkins | F04B 17/05 417/364 |
| 8,328,530 B2 | 12/2012 | Fronzoni | |
| D678,339 S | 3/2013 | Hughes et al. | |
| 8,496,449 B2 | 7/2013 | Knuth et al. | |
| D690,177 S | 9/2013 | Frenken | |
| 8,545,188 B2 | 10/2013 | Infanger | |
| D700,032 S | 2/2014 | Frenken | |
| 8,668,467 B2 | 3/2014 | Douglas et al. | |
| D713,707 S | 9/2014 | Glockseisen | |
| 8,919,176 B2 | 12/2014 | Barezzani et al. | |
| 9,212,655 B2 | 12/2015 | Neumair | |
| 9,470,269 B2 | 10/2016 | West et al. | |
| 9,587,973 B2 | 3/2017 | Kouri | |
| 2003/0070428 A1 * | 4/2003 | Heusser | F04B 17/03 60/468 |
| 2003/0230131 A1 * | 12/2003 | Bowles | B25B 27/10 72/416 |
| 2004/0037709 A1 * | 2/2004 | Sauerbier | F04B 17/03 417/234 |
| 2009/0042446 A1 * | 2/2009 | Borst | H01R 9/2658 439/628 |
| 2010/0154599 A1 | 6/2010 | Gareis | |
| 2011/0008187 A1 | 1/2011 | Infanger | |
| 2011/0214423 A1 | 9/2011 | Givens | |
| 2013/0216398 A1 * | 8/2013 | Stephens | E04H 4/16 417/44.1 |
| 2013/0330216 A1 * | 12/2013 | Yoshida | F04B 17/03 417/440 |
| 2014/0214565 A1 * | 7/2014 | Takasu | G07G 1/14 705/16 |
| 2015/0325112 A1 * | 11/2015 | McPherson | H04W 4/00 455/419 |
| 2015/0361970 A1 * | 12/2015 | White | F04B 53/143 417/320 |
| 2016/0281696 A1 | 9/2016 | Anastas | |
| 2017/0087709 A1 | 3/2017 | Barezzani | |
| 2017/0252911 A1 | 9/2017 | Barezzani et al. | |

* cited by examiner

HYDRAULIC PISTON PUMP FOR A HYDRAULIC TOOL

CROSS-REFERENCE TO RELATED APPLICATION

The present application claims priority to U.S. Provisional Patent Application No. 62/272,815, filed on Sep. 7, 2018, which is hereby incorporated by reference in its entirety.

FIELD

The present disclosure generally relates to hydraulic pumps and systems, and more particularly to systems and methods for a portable hydraulic pump for use with a hydraulic tool.

BACKGROUND

Hydraulic tools can be used to provide an operator with mechanical advantage for performing work on a workpiece. For example, a hydraulic tool may take the form of a cutting device having blades for cutting an object into separate parts. As another example, a hydraulic tool may take the form of a crimping device for making crimping connections, thereby conjoining two separate pieces by deforming one or both pieces in a way that causes them to hold together. As additional examples, a hydraulic tool may take the form of a lifting cylinder for lifting a workpiece and/or a pipe bender for bending a workpiece.

In general, the hydraulic tool is coupled to a hydraulic pump, which is operable to pressurize a hydraulic fluid. The hydraulic pump transfers the pressurized hydraulic fluid to a cylinder in the hydraulic tool. In some implementations, transferring the pressurized hydraulic fluid to the cylinder causes an extendable a ram of a work head of the hydraulic tool (e.g., a cutting head or a crimping head) to drive a first jaw and a second jaw together. In this way, the hydraulic tool uses the pressurized hydraulic fluid from the hydraulic pump to perform the work (e.g., crimp or cut) a workpiece positioned between the first jaw and the second jaw. In other implementations, transferring the pressurized fluid to the cylinder causes the extendable ram to lift a workpiece and/or press a workpiece against a die to modify a shape of the workpiece (e.g., to bend a pipe or tube).

SUMMARY

In an example, a hydraulic pump includes a work port, a high-flow piston, a plurality of high-pressure pistons, and an unloading valve. The work port is configured to couple to a fluid supply line of a hydraulic tool. The high-flow piston is configured to supply fluid along a first flow path to the work port. The high-pressure pistons are configured to supply the fluid along a second flow path to the work port. The unloading valve is fluidly coupled to the first flow path and the second flow path. The unloading valve is actuatable between an open state and a closed state. The unloading valve is configured to permit the fluid to flow from the high-flow piston to the work port in the open state. The unloading valve is configured to inhibit the fluid from flowing from the high-flow piston to the work port in the closed state. The unloading valve is configured to actuate from the open state to the closed state when a pressure level of the fluid in the second flow path exceeds a first threshold pressure.

In another example, a system includes a hydraulic pump and a controller in communication with the hydraulic pump and configured to control operation of the hydraulic pump. The hydraulic pump includes a work port, a hydraulic fluid tank, a high-flow piston, a plurality of high-pressure pistons, an unloading valve, an electric motor, and a mechanical transducer. The work port is configured to couple to a fluid supply line of a hydraulic tool. The hydraulic fluid tank is configured to store a fluid. The high-flow piston is configured to supply the fluid along a first flow path from the hydraulic fluid tank to the work port. The high-pressure pistons are configured to supply the fluid along a second flow path from the hydraulic fluid tank to the work port.

The unloading valve is along the first flow path. The unloading valve is actuatable between an open state and a closed state. The unloading valve is configured to permit the fluid to flow from the high-flow piston to the work port in the open state, and the unloading valve is configured to inhibit the fluid from flowing from the high-flow piston to the work port in the closed state. The unloading valve is also configured to actuate from the open state to the closed state when a pressure level of the fluid in the second flow path exceeds a first threshold pressure.

The electric motor is configured to convert electrical energy into rotational motion. The mechanical transducer is operably coupled to the electric motor, the high-flow piston, and the plurality of high-pressure pistons. The mechanical transducer is configured to convert the rotational motion of the electric motor into a linear motion of the high-flow piston and the plurality of high-pressure pistons.

In another example, a method of operating a hydraulic power tool includes operating, using a battery, an electric motor to actuate a plurality of pistons in a hydraulic pump. The method also includes pressurizing, using the plurality of pistons, a fluid in the hydraulic pump. The method further includes supplying, via a fluid supply line, the fluid from a work port of the hydraulic pump to a ram assembly of a hydraulic tool. Additionally, the method includes actuating, using the pressurized fluid in the ram assembly, a piston of the ram assembly for a stroke to perform an operation on a workpiece positioned in a work area between a plurality of jaws of the hydraulic tool.

During an initial portion of the stroke, pressurizing the fluid from the hydraulic fluid tank includes: (i) supplying, by a high-flow piston, the fluid along a first flow path from a hydraulic fluid tank to the work port, and (ii) supplying, by a plurality of high-pressure pistons, the fluid along a second flow path from the hydraulic fluid tank to the work port. The first flow path includes an unloading valve between the high-flow piston and the work port.

During a subsequent portion of the stroke, pressurizing the fluid from the hydraulic fluid tank includes: (iii) supplying, by the plurality of high-pressure pistons, the fluid along a second flow path from the hydraulic fluid tank to the work port such that the fluid in the second flow path subjecting the unloading valve to a pressure level that is greater than a first threshold pressure, and (iv) responsive to the fluid in the second flow path subjecting the unloading valve to a pressure level that is greater than a first threshold pressure, actuating the unloading valve from an open state to a closed state to inhibit the fluid from flowing along the first flow path from the high-flow piston to the work port.

The features, function, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the terms "substantially" and/or "approximately," it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 1:
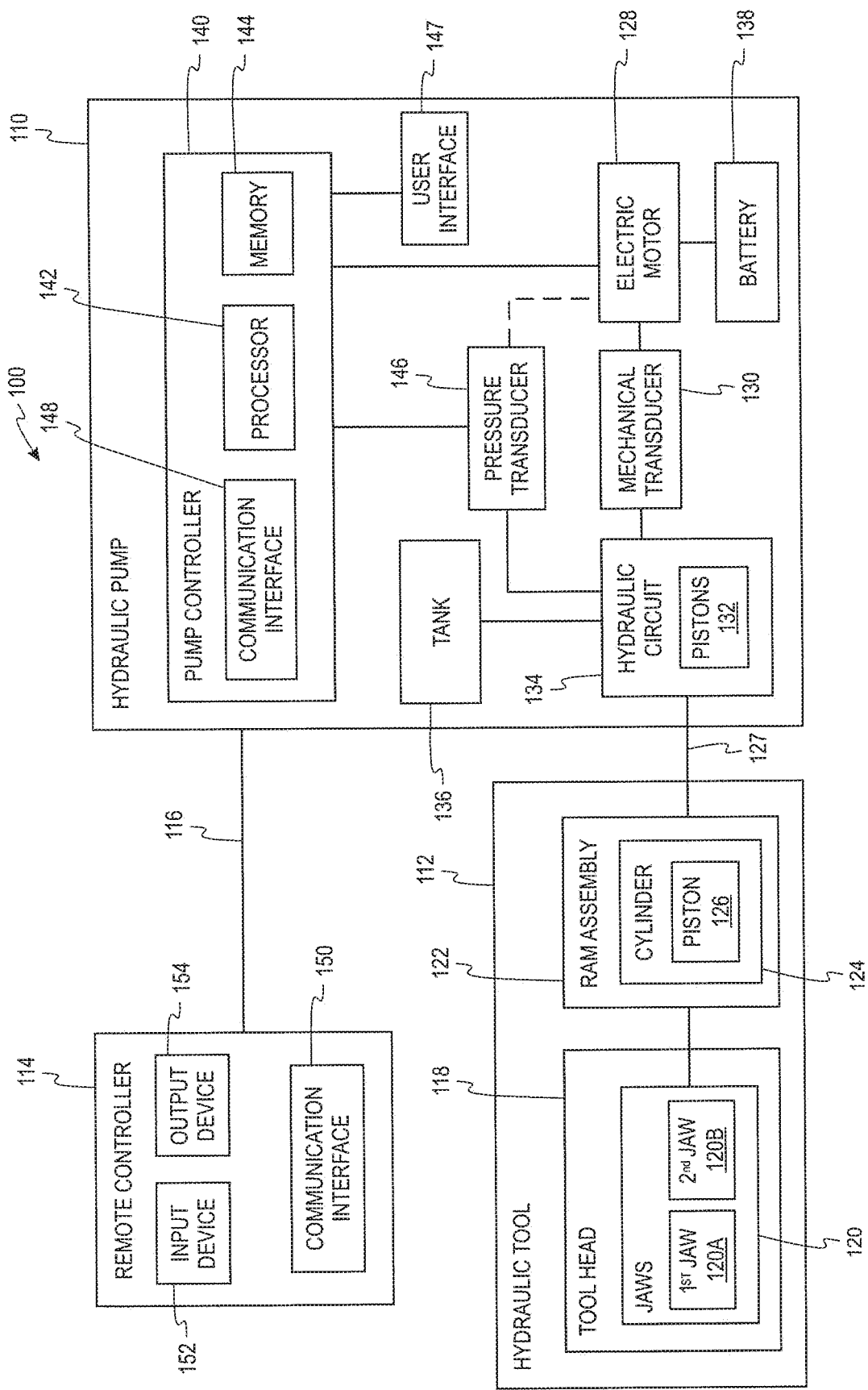
FIG. 1 illustrates a simplified block diagram of a hydraulic power tool system according to an example embodiment.

Referring to FIG. 1, a hydraulic power tool system 100 is illustrated according an example embodiment. As shown in FIG. 1, the hydraulic power tool system 100 includes a hydraulic pump 110, a hydraulic tool 112, and a remote controller 114. In general, the remote controller 114 can communicate (e.g., via a wired and/or a wireless communication link 116) with the hydraulic pump 110 to operate the hydraulic pump 110, which can provide a pressurized fluid (e.g., a hydraulic oil) to actuate the hydraulic tool 112.

As shown in FIG. 1, the hydraulic tool 112 includes a tool head 118, which is operable to perform work on a workpiece. In FIG. 1, the tool head 118 includes a plurality of jaws 120, which can move relative to each other to perform work on a workpiece located between the jaws 120. In FIG. 1, the jaws 120 include a first jaw 120A and a second jaw 120B. However, in other examples, the jaws 120 can include a greater quantity of jaws 120.

In one example, the tool head 118 is in the form of a cutting head. In an implementation of such example, the jaws 120 can include a first blade and a second blade for cutting a workpiece located between the first blade and the second blade.

In another example, the tool head 118 is in the form of a crimping head. In one implementation, the tool head 118 can be a die-less crimping head. For instance, the jaws 120 can include a ram and an anvil for crimping a workpiece. In another implementation, the tool head 118 can be a crimping head having a first crimping die and a second crimping die for crimping the workpiece.

Within examples, the jaws 120 can open and close to perform work on the workpiece such as cutting and/or crimping the workpiece. More specifically, the hydraulic tool 112 can include a ram assembly 122, which can move at least one of the jaws 120 towards another of the jaws 120 until the jaws 120 reach a closed position. In an example in which the tool head 118 is a cutting head with a first blade and a second blade, the jaws 120 can complete a cut of the workpiece when the jaws 120 are at the closed position. In another example, in which the tool head 118 is a crimping head, the jaws 120 can complete a crimp of the workpiece when the jaws 120 are at the closed position.

In an example, the ram assembly 122 can include a hydraulic actuator cylinder 124, which includes a piston 126 slidably accommodated therein. In an implementation, the piston 126 can be coupled (directly or indirectly) to at least one of the jaws 120. When the piston 126 is in a retracted position within the cylinder 124, the jaws 120 are at a home position in which a work area (i.e., a space) is defined between the jaws 120 for positioning a workpiece between the jaws 120. In some implementations, the work area defined between the jaws 120 can also be formed when the jaws 120 are in a partially retracted position. In general, the piston 126 is slidable in the cylinder 124 from the retracted position (and/or the partially retracted position) to an extended position at which the jaws are at the closed position. As the piston 126 moves from the retracted position to the extended position, the piston 126 moves the jaws 120 together to crimp and/or cut the workpiece between the jaws 120

As noted above, the hydraulic pump 110 can provide the pressurized fluid to the hydraulic tool 112. Specifically, the hydraulic pump 110 can be coupled to the ram assembly 122 of the hydraulic tool 112 by a fluid supply line 127. As an example, the fluid supply line 127 can be a hose rated to supply the pressurized fluid at a pressure between 0 pounds per square inch (PSI) and approximately 10,000 PSI. As the hydraulic pump 110 supplies the pressurized fluid to the ram assembly 122, the pressurized fluid pushes the piston 126 in a direction from the retracted position to the extended position in the cylinder 124, which moves the jaws 120 toward each other to crimp and/or cut a workpiece in the work area. When the crimp and/or cut operation is performed, the pressurized fluid can return from the ram assembly 122 to the hydraulic pump 110. As the pressurized fluid returns to the hydraulic pump 110, the piston 126 can move back in a direction from the extended position to the retracted position, which thereby opens the jaws 120.

Although the example system 100 shown in FIG. 1 includes the tool head 118 with the jaws 120, the tool head 118 can omit the jaws 120 in other examples. For instance, in another example, the hydraulic tool 112 can be a hydraulic lift. In this example, the tool head 118 can include a movable-lift structure that is moved by the ram assembly 122 to change an elevation of a workpiece supported by the movable-lift structure. Additionally, in another example, the hydraulic tool 112 can be a pipe bender. In this example, the tool head 118 can include a movable element (e.g., a bend die and/or a bend roll) that can move the workpiece relative to a stationary element (e.g., a stationary die and/or a stationary roll) to change a shape of the workpiece.

As shown in FIG. 1, the hydraulic pump 110 includes an electric motor 128 that can drive, via a mechanical transducer 130, a plurality of pistons 132 of a hydraulic circuit 134 to provide fluid from a hydraulic fluid tank 136 to the hydraulic tool 112. Specifically, the electric motor 128 is configured to convert electrical energy into rotational motion. For instance, in one implementation, the electric motor can include a brushless direct current (DC) motor.

The hydraulic pump 110 can include a power source such as, for instance, a battery 138 for powering the electric motor 128. In one example, the battery 138 has a capacity of at least approximately 12 ampere hours (Ah). In other examples, the battery 138 can have a capacity of approximately 5 Ah, approximately 8 Ah, or approximately 9 Ah. Within examples, the battery 138 is configured to be removably coupled to the electric motor 128 of the hydraulic pump 110. This can be beneficial in implementations in which the battery 138 is rechargeable. The removable coupling between the battery 138 and the electric motor 128 is described in further detail below with respect to FIG. 7.

The mechanical transducer 130 is operably coupled to the electric motor 128 and the pistons 132 of the hydraulic circuit 134. In this arrangement, the mechanical transducer 130 is configured to convert the rotational motion of the electric motor 128 into a linear motion of the pistons 132. In one example, the mechanical transducer 130 can include a cam operably coupled to the electric motor 128 and the pistons 132.

The hydraulic fluid tank 136 operates as reservoir for storing hydraulic oil at a low pressure level (e.g., atmospheric pressure or slightly higher than atmospheric pressure such as 30-70 psi). As such, the tank 136 is in fluid communication with the hydraulic circuit 134. As the electric motor 128 rotates in a first rotational direction, the mechanical transducer 130 causes the pistons 132 to each reciprocate up and down. As the pistons 132 move upward, fluid is withdrawn from the tank 136. As the pistons 132 moves down, the withdrawn fluid is pressurized and delivered to the hydraulic tool 112 via the fluid supply line 127. The operation of the hydraulic circuit 134 is further described below with reference to FIG. 2.

As shown in FIG. 1, the hydraulic pump 110 also includes a pump controller 140 in communication with the electric motor 128. The pump controller 140 can be implemented using hardware, software, and/or firmware. For example, the pump controller 140 can include one or more processors 142 and a memory 144 (i.e., a non-transitory computer readable medium (e.g., volatile and/or non-volatile memory)) that stores machine language instructions or other executable instructions. The instructions, when executed by the one or more processors 142, may cause the pump controller 140 to carry out the various operations of the hydraulic pump 110 described herein. For example, the memory 144 can include instructions that, when executed by the processor(s) 142, cause the pump controller 140 to operate the electric motor 128 and thereby cause the hydraulic pump 110 to supply the pressurized fluid to the hydraulic tool 112.

Additionally, for example, the memory 144 can store data relating to a plurality of modes of operation for the hydraulic pump 110. For instance, the memory 144 can store data for operating the hydraulic pump 110 with a plurality of different types of hydraulic tools 112, a plurality of different types of tool heads 118 (e.g., crimping tool heads, cutting tool heads, hydraulic lifts, and/or pipe benders), a plurality of different types of workpieces (e.g., Aluminum connectors and/or Copper connectors), and/or a plurality of different size workpieces (e.g., workpieces having different diameters and/or shapes). In one implementation, the data stored in the memory 144 can relate to a target distance that the piston 126 is to be moved in the cylinder 124 (and, thus, a distance the jaws 120 are moved) during an operation (e.g., a crimping operation, a cutting operation, a lifting operation, and/or a pipe bending operation).

In another implementation, the data stored in the memory 144 can relate to one or more threshold values. For instance, the memory 144 can store a threshold pressure that relates to an end of a crimping operation and/or a cutting operation by the hydraulic tool 112. To that end, the hydraulic pump 110 can include a pressure transducer 146 in communication with the pump controller 140. The pressure transducer 146 can sense a pressure level of the fluid at one or more locations in the hydraulic circuit 134 (e.g., the pressure level of the fluid at the fluid supply line 127), and generate a signal indicative of the sensed pressure level being greater than a threshold pressure. The threshold pressure can be a threshold value that is indicative of the end of the crimping operation and/or the cutting operation (e.g., a pressure expected when the piston 126 of the ram assembly 122 is at an end of a stroke in the cylinder 124).

In one example, pressure transducer 146 can communicate the sensed pressure level to the pump controller 140. The pump controller 140 can then perform a comparison of the sensed pressure level and the threshold pressure stored in the memory 144, and determine, based on the comparison, when the crimping operation and/or the cutting operation has been completed. In one implementation, responsive to the pump controller 140 determining that the sensed pressure level is greater than the threshold pressure, the pump controller 140 can transmit a signal to the electric motor 128 to cause the electric motor 128 to shut down and/or rotate in a reverse rotational direction and thereby decrease the pressure of the fluid at the hydraulic tool 112. In another implementation, responsive to the pump controller 140 determining that the sensed pressure level is greater than the threshold pressure, the pump controller 140 can transmit a signal to one or more components of the hydraulic circuit 134 (e.g., a valve actuatable responsive to the signal) to decrease the pressure of the fluid at the hydraulic tool 112.

In the example described above, the pressure transducer 146 can transmit a signal indicative of the sensed pressure level to the pump controller 140 and the pump controller can perform the comparison to determine that the signal is further indicative of the sensed pressure level being greater than the threshold pressure. In another example, the pressure transducer 146 can be configured to determine when the sensed pressure level is greater than the threshold pressure. In this example, the pressure transducer 146 can be configured to transmit the signal to the pump controller 140 only when the pressure transducer 146 determines that sensed pressure level is greater than the threshold pressure.

As described in further detail below, the memory 144 can additionally or alternatively store other threshold values relating to operation of the hydraulic tool 112. Also, within examples, the hydraulic pump 110 can include a user interface 147 configured to receive a user input relating operation of the hydraulic pump 110 (e.g., a user input selecting a mode of operation of the hydraulic pump 110 such as, for instance, a cutting mode, a crimping mode, a remote cutting mode, an auto-dump mode, and/or a pressure-hold mode). For example, the user interface 147 can include one or more switches, one or more push buttons, one or more interactive indicating lights, and/or touch screen displays on a housing of the hydraulic pump 110 for receiving the user input. The user interface 147 is in communication with the pump controller 140 and configured to provide the user input to the pump controller 140. In this arrangement, the pump controller 140 can receive the user input from the user interface 147 and responsively configure the hydraulic pump 110 based on the user input.

As also shown in FIG. 1, the pump controller 140 can further include a communication interface 148. The communication interface 148 can facilitate communication between various components of the hydraulic pump 110 such as, for example, the pressure transducer 146, the electric motor 128, the hydraulic circuit 134, the user interface 147, and/or the battery 138. For instance, the communication interface 148 can include a transmitter and a receiver. The hydraulic pump 110 can thus include a respective communication link (e.g., a wired communication link and/or a wireless communication link) between the (i) communication interface 148 and (ii) the pressure transducer 146, the electric motor 128, the hydraulic circuit 134, the user interface 147, and/or the battery 138.

Additionally, as shown in FIG. 1, the communication interface 148 of the hydraulic pump 110 can provide for wired and/or wireless communication with the remote controller 114. As such, the remote controller 114 can include a communication interface 150 for communicating with the communication interface 148 of the hydraulic pump 110 via the communication link 116. The communication interface 150 of the remote controller 114 can thus include a transmitter and a receiver for communicating with the communication interface 148 of the hydraulic pump 110.

As noted above, the communication link 116 can include a wired communication link (e.g., a wired cable). Additionally or alternatively, the communication link 116 can include a wireless communication link (e.g., using Bluetooth® radio technology, communication protocols described in IEEE 802.11 (including any IEEE 802.11 revisions), Cellular technology (such as GSM, CDMA, UMTS, EV-DO, WiMAX, or LTE), Zigbee® technology, and/or an Industrial Scientific and Medical (ISM) ultra-high frequency (UHF) radio technology). Thus, the remote controller 114 can be wirelessly coupled to the hydraulic pump 110.

In one implementation, the remote controller 114 and the hydraulic pump 110 are configured to wirelessly communicate at a frequency of approximately 2.4 gigahertz (Ghz). In another implementation, the remote controller 114 and the hydraulic pump 110 are configured to wirelessly communicate at a frequency that is less than approximately 1 Ghz. For instance, in an implementation, the remote controller 114 and the hydraulic pump 110 are configured to wirelessly communicate at a frequency of approximately 900 megahertz (Mhz), approximately 868 Mhz, or approximately 433 Mhz. In another implementation, the remote controller 114 and the hydraulic pump 110 are configured to wirelessly communicate at a frequency that is configured to pass through an intermediate structure (e.g., the ground, a building wall, and/or a door) and/or substance (e.g., water and/or sewage) between the remote controller 114 and the hydraulic pump 110. This can, for example, facilitate operating the hydraulic pump 110 when the hydraulic pump 110 is in a ditch, in a hole, and/or below ground, while the operator is in a different location. In another implementation, the remote controller 114 and the hydraulic pump 110 are configured to wirelessly communicate at a frequency that is in an unlicensed spectrum.

As noted above, the remote controller 114 can control operation of the hydraulic pump 110. As shown in FIG. 1, the remote controller 114 includes an input device 152 and an output device 154. The input device 152 can receive a user input for controlling operation of the hydraulic pump 110. For example, the input device 152 can include one or more switches, push buttons, and/or touch screen displays for receiving the user input. The communication interface 150 of the remote controller 114 can communicate the user input from the input device 152 to the pump controller 140 of the hydraulic pump 110.

In one example, responsive to a first user input received by the input device 152, the remote controller 114 can transmit a first signal to cause the hydraulic pump 110 to operate in a forward mode in which a pressure of the fluid, which is supplied to the hydraulic tool 112, increases. Additionally, responsive to a second user input received by the input device 152, the remote controller 114 can transmit a second signal to the hydraulic pump 110 to cause the hydraulic pump 110 to operate in a reverse mode in which the pressure of the fluid, which is supplied to the hydraulic tool 112, decreases. Accordingly, the remote controller 114 is actuatable to control the flow of the pressurized fluid from the hydraulic pump 110 to and/or from the hydraulic tool 112, and thereby move the jaws 120 relative to a workpiece in the work area (and/or actuate the tool head 118 of a hydraulic lift or pipe bender). In this way, the user input device 1868 is actuatable to initiate and/or terminate an operation (e.g., a cutting operation and/or a crimping operation) at a safe distance away from the tool head 118 and/or the workpiece (e.g., a live wire or cable).

Additionally or alternatively, the input device 152 of the remote controller 114 can be configured to receive a user input selecting a mode of operation of the hydraulic pump 110 in a manner similar to that described above with respect to the user interface 147. In one implementation, responsive to the user input, the communication interface 150 of the remote controller 114 can communicate the selected mode of operation to the pump controller 140 of the hydraulic pump 110 to cause the hydraulic pump 110 to set one or more threshold pressures to a value corresponding to the selected mode of operation. By selecting the mode of operation via the remote controller 114, operational efficiency and speed can be increased relative to scenarios in which an operator travels from a remote location of the remote controller 114 to a location of the user interface 147 on the housing to change the mode of operation.

As noted above, the remote controller 114 also includes the output device 154, which can be in communication with the pump controller 140 via the communication interface 150 of the remote controller 114 and the communication interface 148 of the hydraulic pump 110. Within examples, the hydraulic pump 110 can transmit a feedback signal to the remote controller 114 to indicate at least one condition related to an operation (e.g., one or more conditions relating to a good crimp, a bad crimp, a cut being completed, a cut not being completed, a good bend, a bad bend, a good lift, and/or a bad lift). As an example, the pump controller 140 can be configured to determine the at least one condition based on the sensed pressure level received from the pressure transducer 146 and/or data relating to the selected mode of operation for the hydraulic pump 110.

Within examples, the output device 154 can be configured to provide the operator of the remote controller 114 with a visual indication and/or an auditory indication that the jaws 120 are in the closed position and/or the cutting operation is completed. For instance, the output device 154 can include an indicator light, a display screen, and/or a speaker to provide the indication(s) to the operator. Accordingly, in an environment in which live wires are to be cut, the indication provided to the operator relating to the at least one condition can beneficially facilitate safe operation of the hydraulic tool 112 at remote distances.

In some examples, the hydraulic pump 110 can be configured to detect a loss of wireless communication with the remote controller 114. Responsive to detecting the loss of wireless communication with the remote controller 114, the hydraulic pump 110 can wirelessly communicate with a different remote controller to: (i) authenticate the different remote controller, and (ii) after authenticating the different remote controller, pair with the different remote controller. This can, among other things, beneficially facilitate continued use of the hydraulic pump when the remote controller 114 is lost or damaged, thereby extending the life of the hydraulic pump 110.

In some examples, to increase the efficiency of the hydraulic tool 112, it may be desirable to have the piston 126 move at non-constant speeds and apply different loads based on a state of the hydraulic tool 112, a crimping operation, a type of crimp that is desired, a cutting operation, a type of cut that is desired, a pipe bending operation, and/or a type of bend that is desired. For instance, the piston 126 can be configured to advance rapidly at a relatively fast speed while travelling within the cylinder 124 before one or more of the jaws 120 reach a workpiece to be crimped and/or cut. Once the jaw(s) 120 reach the workpiece, the piston 126 can slow down, but cause the jaws 120 to apply a relatively large force to perform the crimp operation and/or the cut operation. Within examples, the hydraulic circuit 134 can be configured to move the piston 126 at non-constant speeds.

Figure 2:
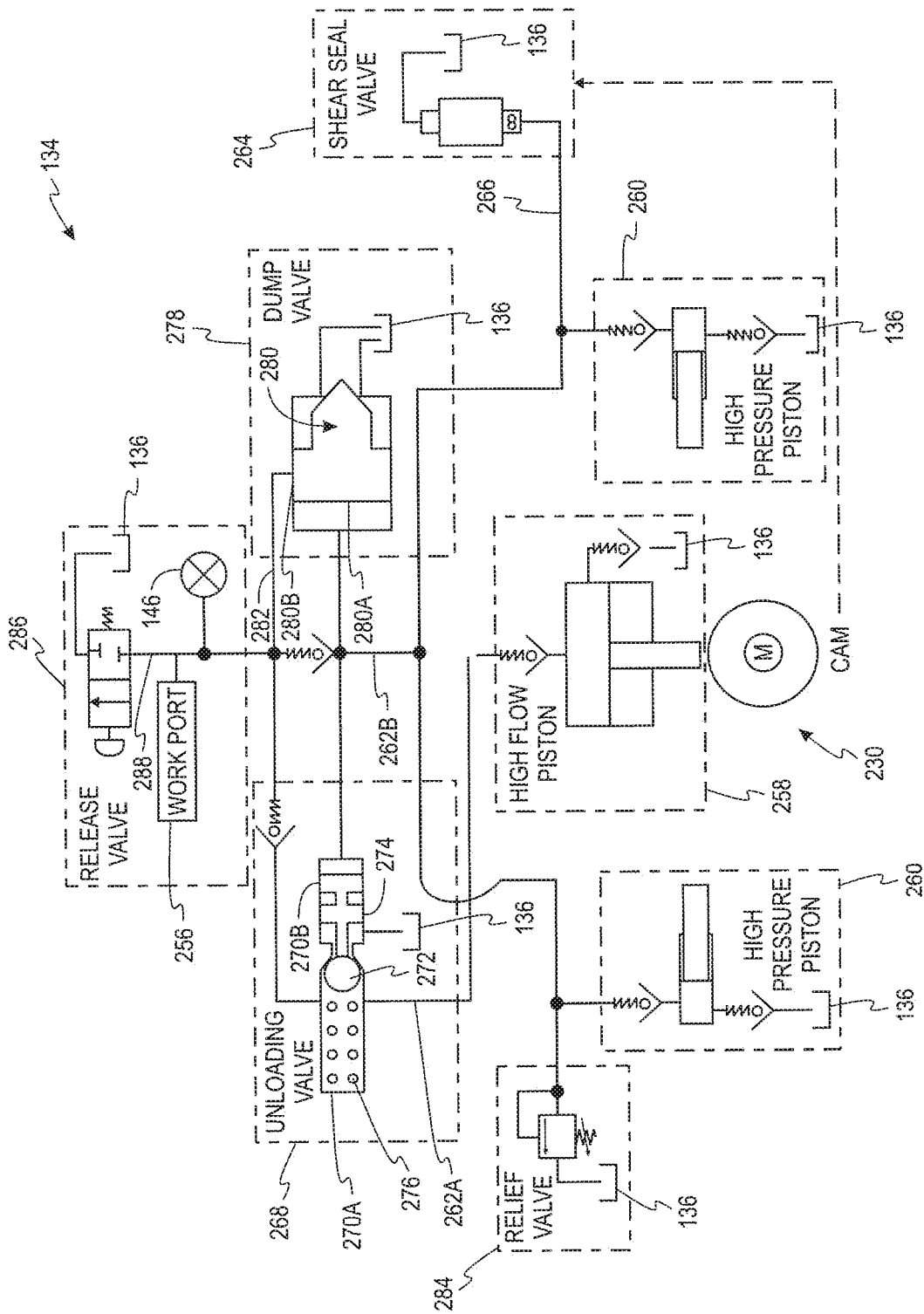
FIG. 2 illustrates a simplified block diagram of a hydraulic circuit according to an example embodiment.

FIG. 2 depicts a schematic diagram of the hydraulic circuit 134 for pressurizing the fluid and controlling the flow of fluid between of the hydraulic pump 110 and the hydraulic tool 112 according to an example embodiment. Additionally, FIGS. 3-6 depict partial cross-sectional views of the hydraulic pump 110 showing components of the hydraulic circuit 134 in FIG. 2.

Figure 6:
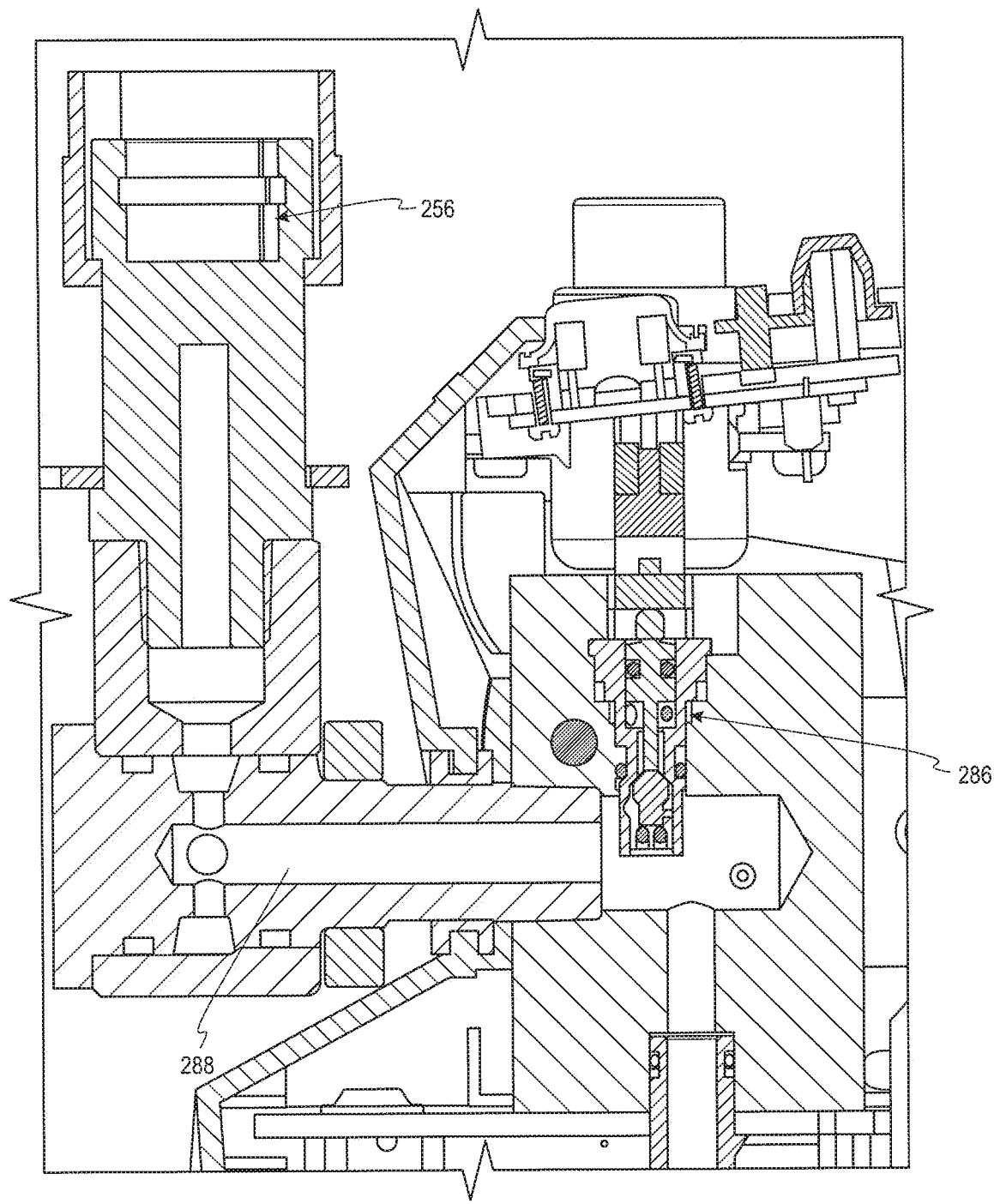
FIG. 6 illustrates another partial cross-sectional view of a hydraulic pump according to an example embodiment.

As shown in FIG. 2 and FIG. 6, the hydraulic circuit 134 includes a work port 256 configured to couple to the fluid supply line 127 of the hydraulic tool 112. The work port 256 is thus configured to supply pressurized fluid to the hydraulic tool 112, as described in further detail herein.

Figure 3:
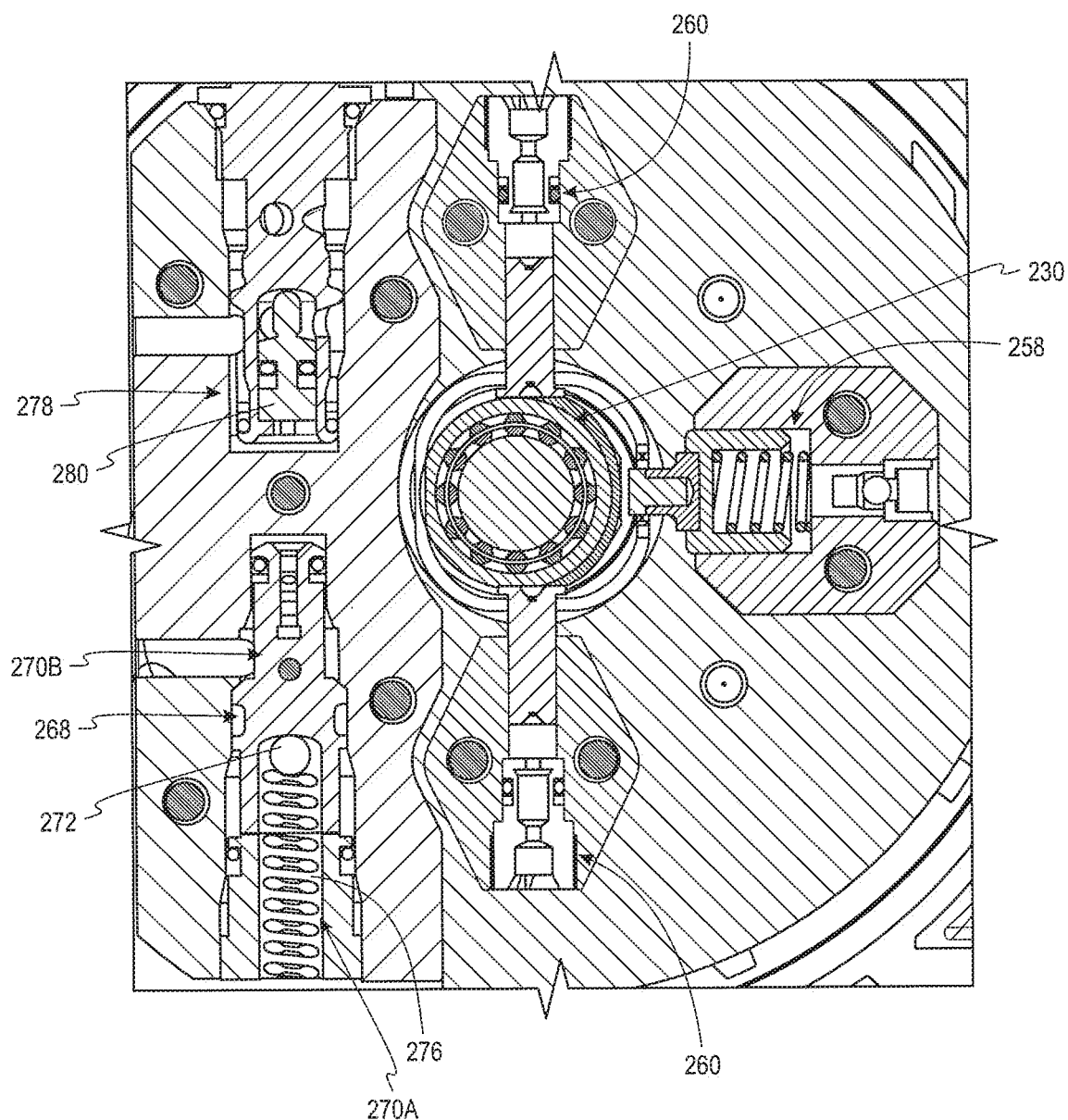
FIG. 3 illustrates a partial cross-sectional view of a hydraulic pump according to an example embodiment.

As noted with respect to FIG. 1, the hydraulic circuit 134 includes the plurality of pistons 132. In FIGS. 2-3, the pistons 132 of the hydraulic circuit 134 include a high-flow piston 258 and a plurality of high-pressure pistons 260. The high-flow piston 258 is configured to supply fluid along a first flow path 262A from the tank 136 to the work port 256. The high-pressure pistons 260 are configured to supply the fluid from the tank 136 along a second flow path 262B to the work port 256. As shown in FIGS. 2-3, a surface area of the high-flow piston 258 is greater than a respective surface area of each of the high-pressure pistons 260. In this arrangement, the high-flow piston 258 is configured to supply the fluid at a first flow rate and a first pressure level, each high-pressure piston 260 is configured to supply the fluid at a second flow rate and a second pressure level, the first flow rate is greater than the second flow rate, and the first pressure level is less than the second pressure level.

As noted above, the electric motor 128 can convert electrical energy from the battery 138 into rotational motion. In FIGS. 2-3, the mechanical transducer 130 includes a cam 230 operably coupled to the electric motor 128, the high-flow piston 258, and the plurality of high-pressure pistons 260. In this arrangement, the cam 230 is configured to convert the rotational motion of the electric motor 128 into a linear motion of the high-flow piston 258 and the plurality of high-pressure pistons 260. As such, when the electric motor 128 rotates in a first rotational direction, the high-flow piston 258 and the high-pressure pistons 260 each reciprocate to withdraw fluid from the tank 136, and supply the fluid along the first flow path 262A and the second flow path 262B, respectively. As the electric motor 128 initially rotates in the first rotational direction, a shear seal valve 264 remains closed such that a passage 266 is decoupled from the tank 136.

Figure 13:
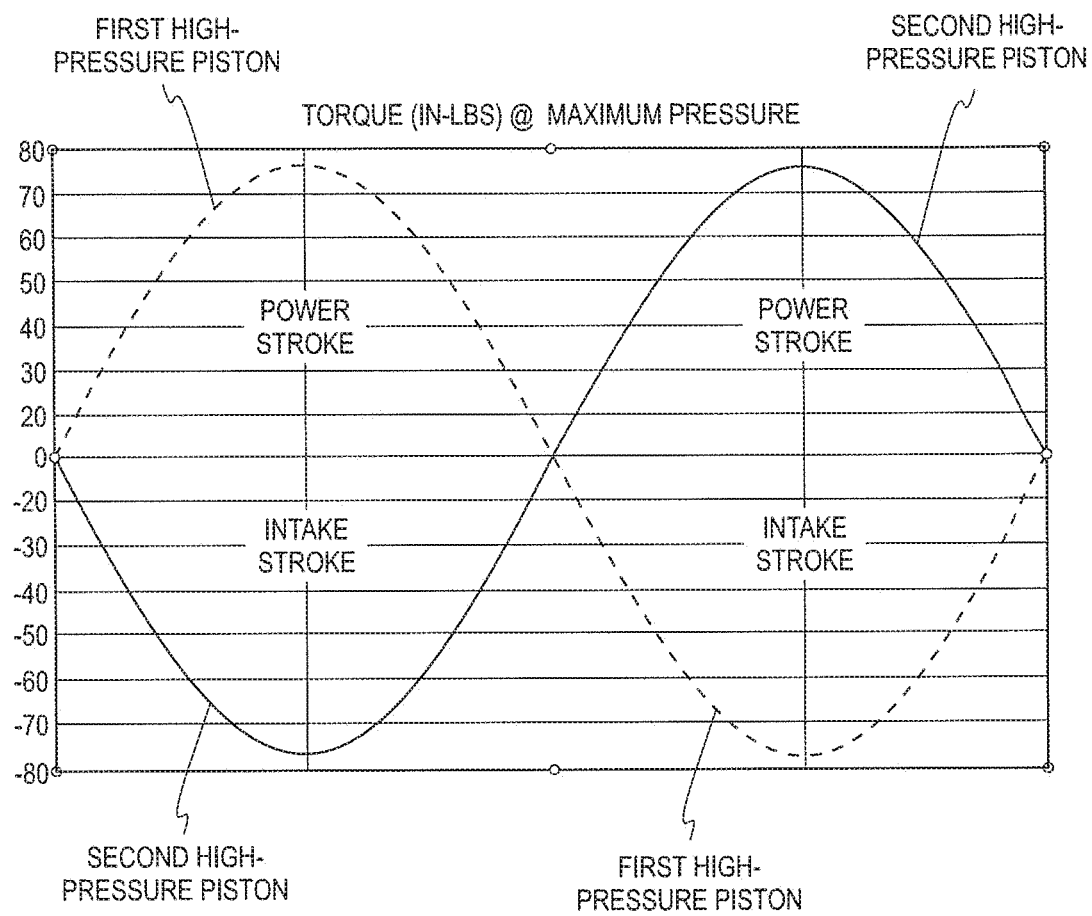
FIG. 13 illustrates a chart for a stroke of a plurality of high-pressure pistons according to an example embodiment.

Within examples, the high-pressure pistons 260 can include two high-pressure pistons 260 offset relative to each other by 180 degrees. In this arrangement, while a first one of the high-pressure pistons 260 withdraws the fluid from the tank 136, the second one of the high-pressure pistons 260 supplies the fluid to the second flow path 262B. Then when the second one of the high-pressure pistons 260 withdraws the fluid from the tank 136, the first one of the high-pressure pistons 260 supplies the fluid to the second flow path 262B. The 180 degree offset configuration of the high-pressure pistons 260 is shown, for example, in FIG. 13.

As shown in FIGS. 2-3, the hydraulic circuit 134 also includes an unloading valve 268 fluidly coupled to the first flow path 262A and the second flow path 262B. The unloading valve 268 is actuatable between an open state and a closed state. In FIG. 2, the unloading valve 268 is shown in the open state. The unloading valve 268 is configured to permit the fluid to flow from the high-flow piston 258 to the work port 256 in the open state, and the unloading valve 268 is configured to inhibit the fluid from flowing from the high-flow piston 258 to the work port 256 in the closed state.

Within examples, the unloading valve 268 is configured to actuate from the open state to the closed state when a pressure level of the fluid in the second flow path 262B exceeds a first threshold pressure. For instance, in FIGS. 2-3, the unloading valve 268 includes a first chamber 270A fluidly coupled to the first flow path 262A and a movable ball 272 disposed in the first chamber 270A. The unloading valve 268 also includes a second chamber 270B including a plunger 274 configured to move the movable ball 272 from a seated position (shown in FIGS. 2-3) to an unseated position. The second chamber 270B is fluidly coupled to the tank 136. The plunger 274 is configured to be subjected to the fluid in the second flow path 262B. The unloading valve 268 further includes a spring 276 in the first chamber 270A and biasing the movable ball 272 toward the seated position at which the movable ball 272 is configured to block fluid communication between the first chamber 270A and the second chamber 270B.

In this arrangement, when the pressure level of the fluid in the second flow path 262B exceeds the first threshold pressure, the plunger 274 applies a force to the movable ball 272 that overcomes a biasing force of the spring 276 and moves the movable ball 272 to the unseated position. When the movable ball 272 is in the unseated position, the first chamber 270A is fluidly coupled to the hydraulic fluid tank 136 via the second chamber 270B. As such, once the pressure level of the fluid in the second flow path 262B exceeds the first threshold pressure, the high-flow piston 258 ceases supplying the fluid to the work port 256 while the high-pressure pistons 260 continue to supply the fluid to the work port 256. In this way, the hydraulic circuit 134 can drive the piston 126 at a first speed and apply a first load to the jaws 120 during an initial portion of a stroke, and the hydraulic circuit 134 can drive the piston 126 at a second speed and apply a second load during a subsequent portion of the stroke.

Within examples, the first threshold pressure can be related to an expected fluid pressure exerted by the fluid on the plunger 274 when the jaws 120 of the tool head 118 apply an initial crimp force and/or an initial cut force on a workpiece. For instance, once the piston 126 of the ram assembly 122 begins to experience an increased pressure as it exerts an initial crimp force and/or an initial cut force on an outer surface of the workpiece, the fluid pressure exerted by the fluid on the plunger will also increase to the first pressure threshold. As an example, the first threshold pressure can be between approximately 300 PSI and approximately 600 PSI; however, other pressure values are possible.

As shown in FIG. 3, the pressure transducer 146 is configured to sense a pressure level of the fluid supplied to the work port 256 (e.g., and, thus, a pressure of the fluid within the cylinder 124 of the ram assembly 122). Also, as described above, the pressure transducer 146 can generate a signal indicative of the sensed pressure level being greater than a second threshold pressure, which is indicative of an end of an operation of the hydraulic tool 112 (e.g., indicative of a completed crimp, a completed cut, a completed lift, a completed pipe bend, and/or the piston 126 reaching an end of a stroke within the cylinder 124). In an example, the second threshold pressure can be a value between approximately 8000 PSI to approximately 12,000 PSI. In further examples, the second threshold pressure can be a value greater than approximately 9000 PSI or a value greater than approximately 10,000 PSI. In another example, the second threshold pressure can be a value between approximately 10,100 PSI and approximately 10,405 PSI; however, other values are possible.

Figure 4:
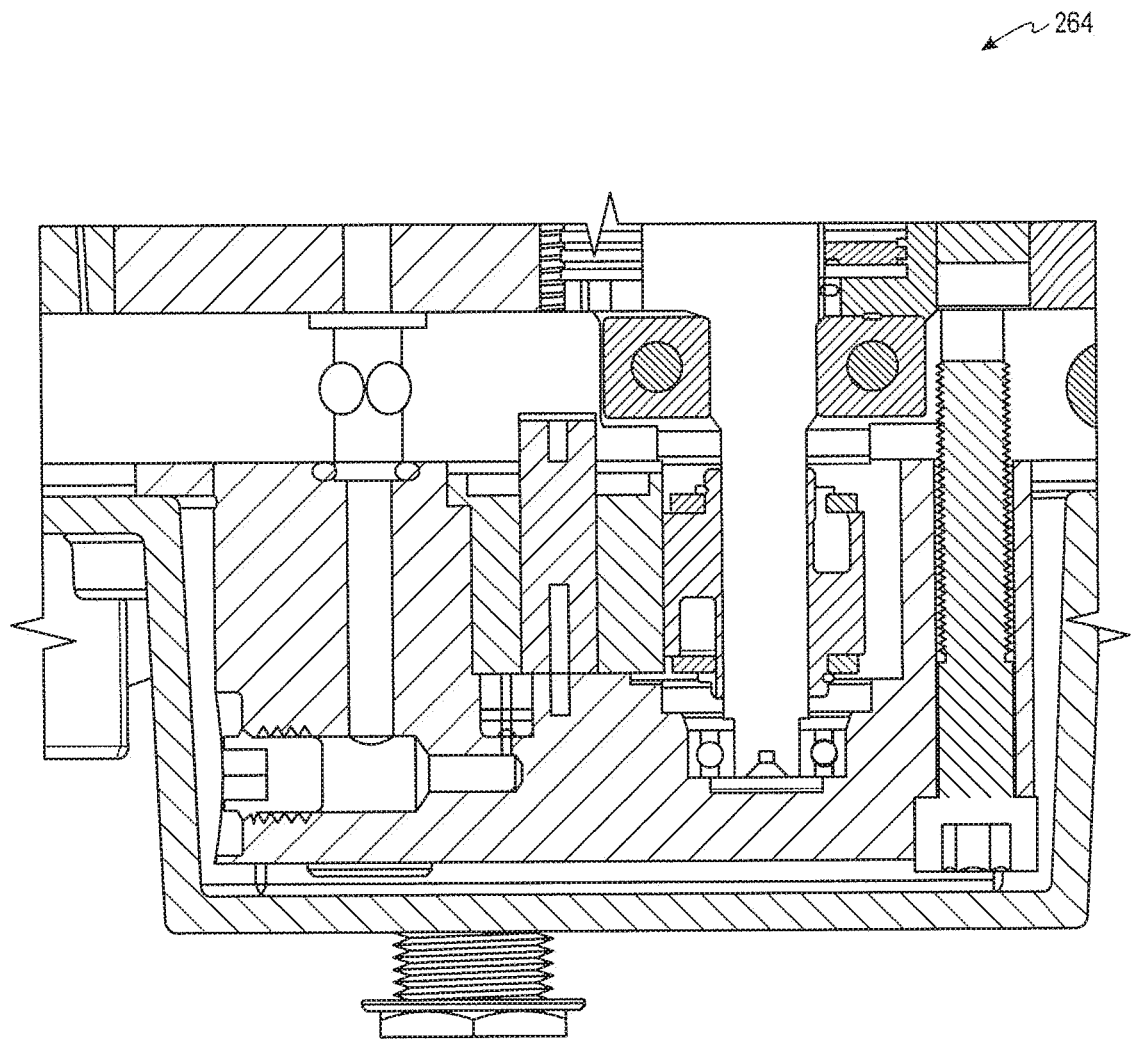
FIG. 4 illustrates another partial cross-sectional view of a hydraulic pump according to an example embodiment.

While the pressure level sensed by the pressure transducer 146 is below the second threshold pressure, the pump controller 140 commands the electric motor 128 to rotate in the first rotational direction and the shear seal valve 264 remains closed such that the passage 266 is decoupled from the tank 136 (see FIG. 4). However, after the pressure transducer 146 generates a signal indicating that the sensed pressure level is greater than the second threshold pressure, the pump controller 140 commands the electric motor 128 to stop and reverse the rotational motion to a second rotational direction opposite the first rotational direction. Rotating the electric motor 128 in the second rotational direction causes the shear seal valve 264 to open, thus causing a fluid path along the passage 266 to form between the second flow path 262B and the tank 136.

More generally, the shear seal valve 264 is configured such that, responsive to the signal indicative of the sensed pressure level being greater than a second threshold pressure, fluidly couples the second flow path 262B to the tank 136. As a result of fluid in the second flow path 262B flowing to the tank 136 when the shear seal valve 264 is opened, the pressure of the fluid in the second flow path 262B decreases. In turn, the decreased pressure of the fluid in the second flow path 262B causes the piston 126 to retract back to a desired position, such as the home position or a partially-retracted position.

To further facilitate decreasing the pressure of the fluid in the hydraulic tool 112 and retract the piston 126 to the desired position, the hydraulic circuit 134 can include a dump valve 278. As shown in FIGS. 2-3, the dump valve 278 has a movable element 280 including (i) a first surface 280A configured to be subjected to the fluid in the second flow path 262B, and (ii) a second surface 280B configured to be subjected to the fluid in a return flow path 282 between the work port 256 and the dump valve 278. In one example, the movable element 280 can include a poppet.

In general, the movable element 280 is configured to move from a first position to a second position responsive to a fluid pressure differential between the fluid at the second surface 280B and the fluid at the first surface 280A being greater than a threshold pressure differential. When the movable element 280 is in the first position, the dump valve 278 is configured to fluidly decouple the return flow path 282 from the hydraulic fluid tank 136. Whereas, when the movable element 280 is in the second position, the dump valve 278 is configured to fluidly couple the return flow path 282 to the hydraulic fluid tank 136.

In this arrangement, while the hydraulic pump 110 increases the pressure of the fluid at the work port 256 (e.g., while closing the jaws 120 during a crimp operation and/or a cut operation), the fluid in the second flow path 262B subjects the movable element 280 to a pressure, which maintains the movable element 280 of the dump valve 278 in the first position. Whereas, after the shear seal valve 264 opens and fluidly couples the second flow path 262B to the tank 136, the fluid in the second flow path 262B subjects the movable element 280 of the dump valve 278 to a reduced pressure such that the movable element 280 moves to the second position. As such, the dump valve 278 can provide for returning the fluid in cylinder 124 of the hydraulic tool 112 back to the tank 136 as the piston 126 (and, thus, the jaws 120) retract to the desired position (e.g., the home position and/or a partially retracted position).

In some cases, the shear seal valve 264 might not operate properly. For instance, when the electric motor 128 is commanded to rotate in the second rotational position, the shear seal valve 264 may not open a path from the passage 266 to the tank 136, and pressure level in the second flow path 262B may remain relatively high. In this case, the dump valve 78 may also be actuated and thus the pressure of the fluid in the cylinder 124 of the hydraulic tool 112 is not relieved. As such, the piston 126 of the ram assembly 122 may not return to the home position and/or the partially retracted position. To mitigate a fault of the shear seal valve 264, the hydraulic circuit 134 can include a relief valve 284.

Figure 5:
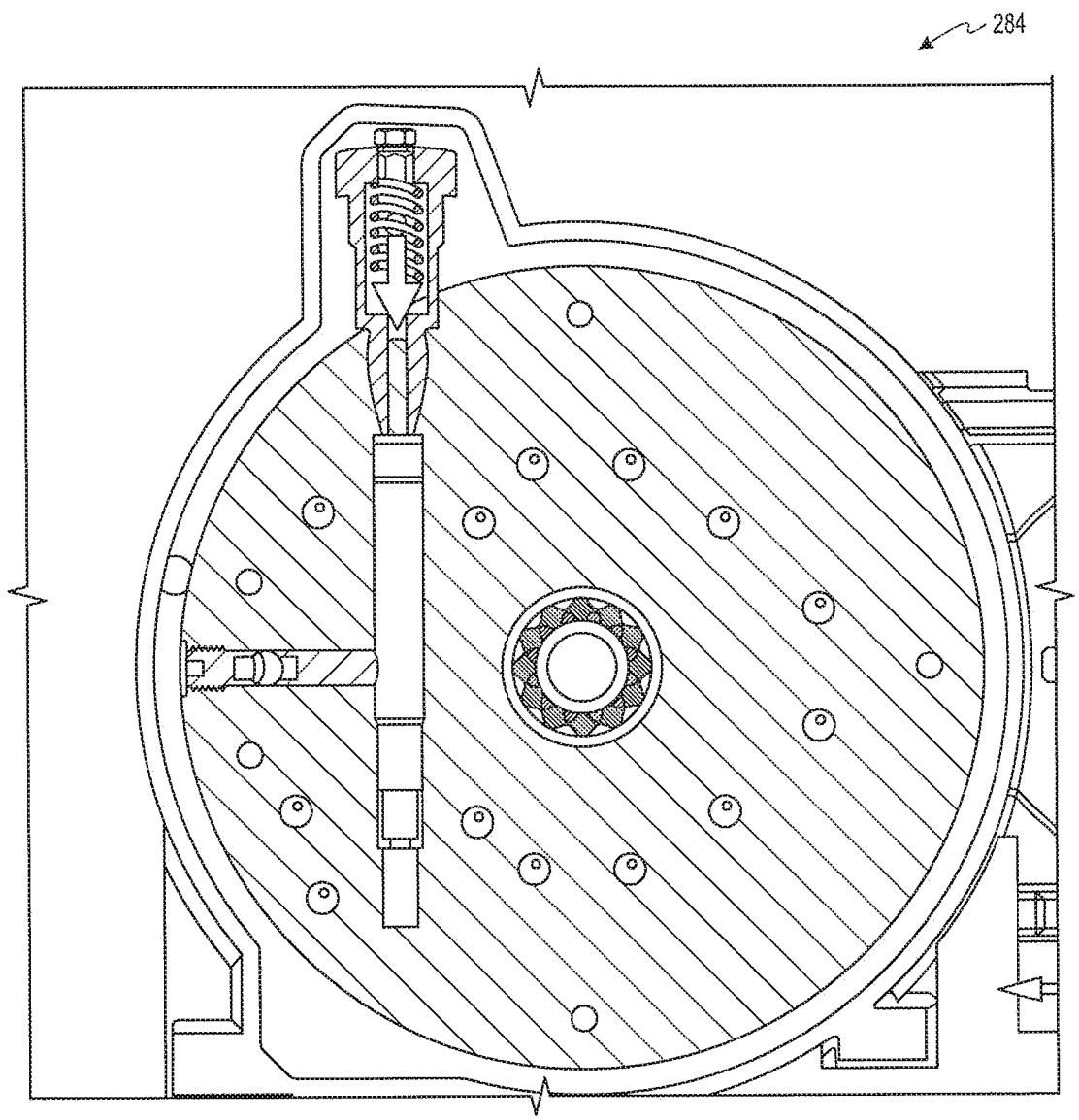
FIG. 5 illustrates another partial cross-sectional view of a hydraulic pump according to an example embodiment.

The relief valve is shown in FIGS. 2 and 5 according to an example embodiment. In this example, the relief valve 284 is a hydro-mechanical valve configured to open and return the fluid in the second flow path 262B to the hydraulic fluid tank 136 when the fluid applies a pressure on the relief valve 284 that is greater than the third threshold pressure. Whereas, when the pressure fluid in the second flow path 262B applies a pressure on the relief valve 284 that is less than the third threshold pressure, the relief valve 284 is closed and blocks a path to the tank 136.

In general, the third threshold pressure is greater than the second threshold pressure such that the relief valve is actuated in the event of a fault with the shear seal valve 264, which is actuated based on the second pressure threshold.

As shown in FIG. 2 and FIG. 6, the hydraulic circuit 134 can also include a release valve 286. The release valve 286 is manually actuatable to return the fluid along a return flow path 288 from the work port 256 to the hydraulic fluid tank 136. For example, as shown in FIG. 6, the release valve 286 can include a button 290 coupled to the release valve 286. The button 290 and the release valve 286 can be biased towards a closed position in which the release valve 286 fluidly decouples the return flow path 288 from the tank 136. Responsive to actuating the button 290, the button 290 moves the release valve 286 to an open position in which the release valve 286 fluidly couples the return flow path 288 to the tank 136. When the release valve 286 fluidly couples the return flow path 288 to the tank 136, the fluid can flow from the cylinder 124 of the hydraulic tool 112 through the fluid supply line 127 and the work port 256 to the tank 136. As a result, the pressure of the fluid in the cylinder 124 decreases, which retracts the piston 126 of the ram assembly 122 back to the desired position. The release valve 286 can thus provide for an emergency stop of a crimping operation and/or a cutting operation by the hydraulic tool 112.

As noted above, the hydraulic circuit 134 can drive the piston 126 at a first speed and apply a first load to the tool head 118 during an initial portion of a stroke, and the hydraulic circuit 134 can drive the piston 126 at a second speed and apply a second load during a subsequent portion of the stroke. This is achieved, at least in part, based on the unloading valve 268 controlling the supply of the fluid in the first flow path 262A as described above. In particular, as noted above, once the pressure level of the fluid in the second flow path 262B exceeds the first threshold pressure, the high-flow piston 258 ceases supplying the fluid to the work port 256 while the high-pressure pistons 260 continue to supply the fluid to the work port 256.

Within examples, the demarcation between the initial portion of the stroke and the subsequent portion of the stroke can be related to the first threshold value. As noted above, the first threshold value can be a value between approximately 300 PSI and approximately 600 PSI. Thus, for instance, in an implementation in which the first threshold value is approximately 600 PSI, the initial portion of the stroke can include fluid pressures between 0 PSI and approximately 600 PSI and the subsequent portion of the stroke can include fluid pressures greater than approximately 600 PSI (e.g., up to the second threshold pressure noted above).

As examples, the electric motor 128, the battery 138, the high-flow piston 258, and the high-pressure pistons 260 can be configured to, during the initial portion of the stroke, supply the fluid to the work port 256 at a flow rate of (i) greater than approximately 50 cubic inches per minute, (ii) greater than approximately 105 cubic inches per minute, (iii) greater than approximately 125 cubic inches per minute, or (iv) greater than approximately 134 cubic inches per minute. Also, as examples, the electric motor 128, the battery 138, the high-flow piston 258, and the high-pressure pistons 260 can be configured to, during the subsequent portion of the stroke, supply the fluid to the work port 256 at a flow rate of (i) greater than approximately 25 cubic inches per minute, (ii) greater than approximately 50 cubic inches per minute, (iii) greater than approximately 60 cubic inches per minute, or (iv) greater than approximately 63.4 cubic inches per minute. In another example, the electric motor 128, the battery 138, the high-flow piston 258, and the high-pressure pistons 260 can be configured to, during the subsequent portion of the stroke, supply the fluid to the work port 256 at a flow rate of approximately 33.4 cubic inches per minute.

Within examples, the electric motor 128, the battery 138, and the hydraulic circuit 134 (including the high-pressure pistons 260 offset from each other) can, in combination, achieve the relatively high flow rates of the fluid at both relatively low pressures and relatively high pressures (such as, e.g., the pressure levels described above).

In some implementations, the hydraulic power tool system 100 can provide for more rapid crimping operations than existing systems. For instance, in some implementations, the hydraulic power tool system 100 can crimp an aluminum conductor steel reinforced (ASCR) workpiece in less than approximately 45 seconds. In another implementation, the hydraulic power tool system 100 can crimp an ASCR workpiece in less than approximately 35 seconds. In another implementation, the hydraulic power tool system 100 can crimp an ASCR workpiece in less than approximately 25 seconds.

Additionally, within examples, the battery 138 can beneficially support more work per battery charge than prior systems. For instance, in one implementation, the battery 138 can have a capacity of approximately 5 Ah and the hydraulic power tool system 100 can perform more than 17 crimps on a single charge. In another implementation, the battery 138 can have a capacity of approximately 9 Ah and the hydraulic power tool system 100 can perform more than 29 crimps on a single charge. In another implementation, the battery 138 can have a capacity of approximately 12 Ah and the hydraulic power tool system 100 can perform more than 40 crimps on a single charge.

Figure 7:
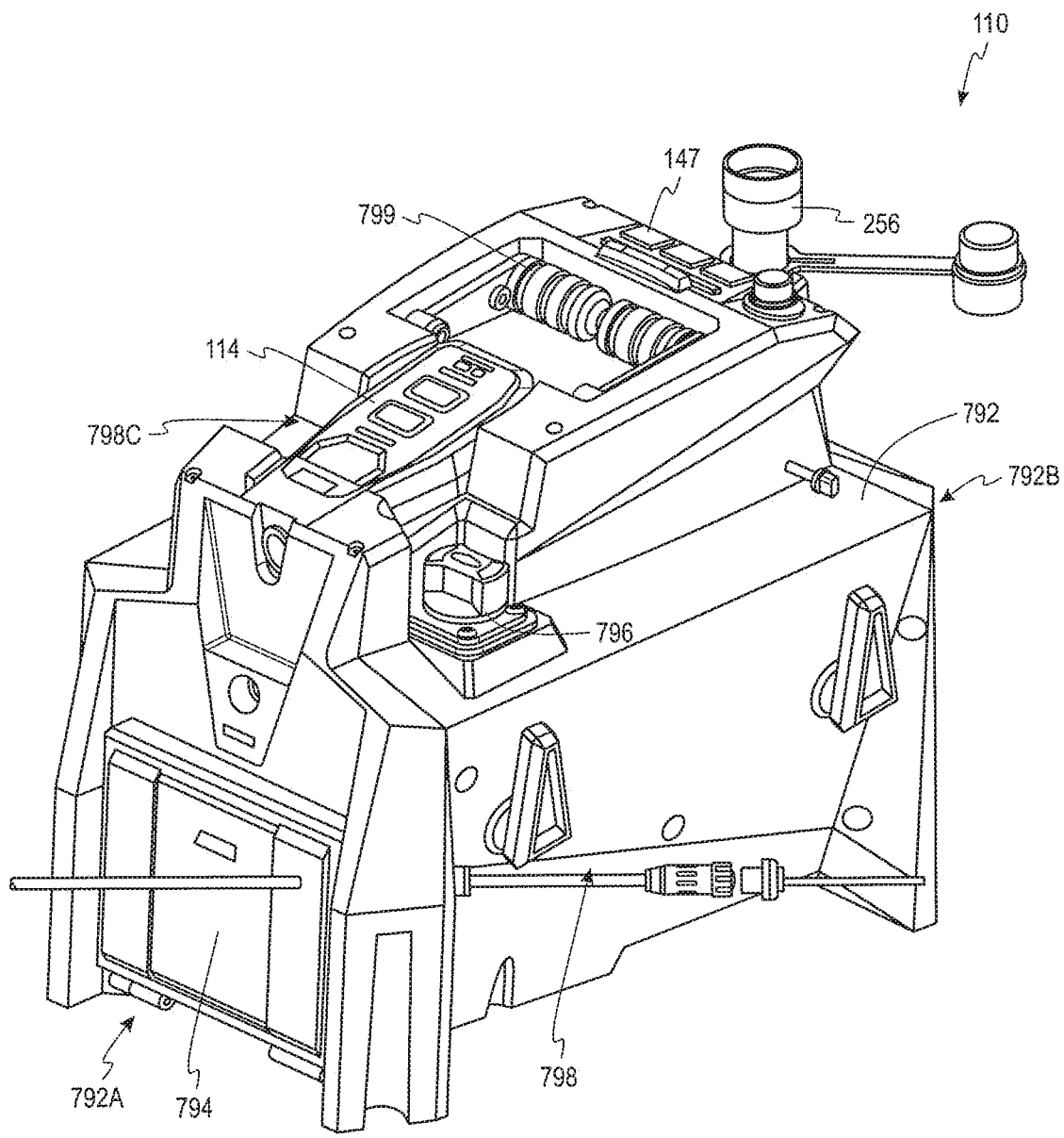
FIG. 7 illustrates a perspective view of a hydraulic pump according to an example embodiment.

Referring now to FIG. 7, a perspective view of the hydraulic pump 110 is illustrated according to an example embodiment. As shown in FIG. 7, the hydraulic pump 110 includes a housing 792 defining an enclosed space. Within examples, one or more of the components of the hydraulic pump 110 can be housed in the enclosed space defined by the housing 792. For example, the electric motor 128, the mechanical transducer 130, the hydraulic circuit 134 (e.g., including the high-flow piston 258 and the plurality of high-pressure pistons 260), the hydraulic fluid tank 136, the battery 138, the pump controller 140, and/or the pressure transducer 146 can be in the enclosed space defined by the housing 792.

As noted above, the battery 138 can be removably coupled to the electric motor 128 of the hydraulic pump 110. In FIG. 7, the housing 792 of the hydraulic pump 110 includes a battery door 794 that can be opened to provide access to a battery compartment in the enclosed space of the housing 792. The battery door 794 can also be closed and latched to secure the battery 138 in the housing 792 and coupled to the electric motor 128. Additionally, the battery door 794 can help to protect the battery 138 against exposure to potentially harmful conditions in an environment in which the hydraulic pump 110 is located.

In FIG. 7, the battery 138 is removably coupled to a bottom part of a rear portion 792A of the housing 792 (i.e., opposite a front portion 792B of the housing 792 at which the user interface 147 and/or the work port 256 are located). However, the battery 138 can be located at a different portion of the housing 792 in an alternative example.

Additionally, in FIG. 7, the hydraulic pump 110 includes a fill port 796 for accessing the hydraulic fluid tank 136. For example, the fill port 796 can include a cap covering an opening. When the cap is coupled to the fill port 796, the fill port 796 is closed, thereby inhibiting access to the hydraulic fluid tank 136. Whereas, when the cap is decoupled from the fill port 796, the fill port 796 is open, thereby providing access to the hydraulic fluid tank 136. The fill port 796 can thus be opened to facilitate refilling the hydraulic fluid tank 136 with the fluid.

In FIG. 7, the hydraulic pump 110 further includes a cord wrapping assembly 798. The cord wrapping assembly 798 can be configured to receive and retain the pendant cable 916A so as to reduce (or minimize) excess length of the pendant cable 916A extending between the hydraulic pump 110 and the remote controller 114.

The hydraulic pump 110 can also include a bucket hanger feature 799, which is configured to hang the hydraulic pump 110 from a support structure such as, for example, a picker bucket. Additionally, the bucket hanger feature 799 can provide a handle for transporting the hydraulic pump 110.

Within examples, the housing 792 can include a recessed portion 798C that is configured to receive and retain the remote controller 114. For instance, in FIG. 7, the remote controller 114 is coupled to the recessed portion 798C on an upper portion of the housing 792. As such, the recessed portion 798C can provide a storage compartment for the remote controller 114 on the housing 792. In other examples, the housing 792 can include one or more additional or alternative storage compartments for removably coupling the remote controller 114 to the housing 792.

Figure 8:
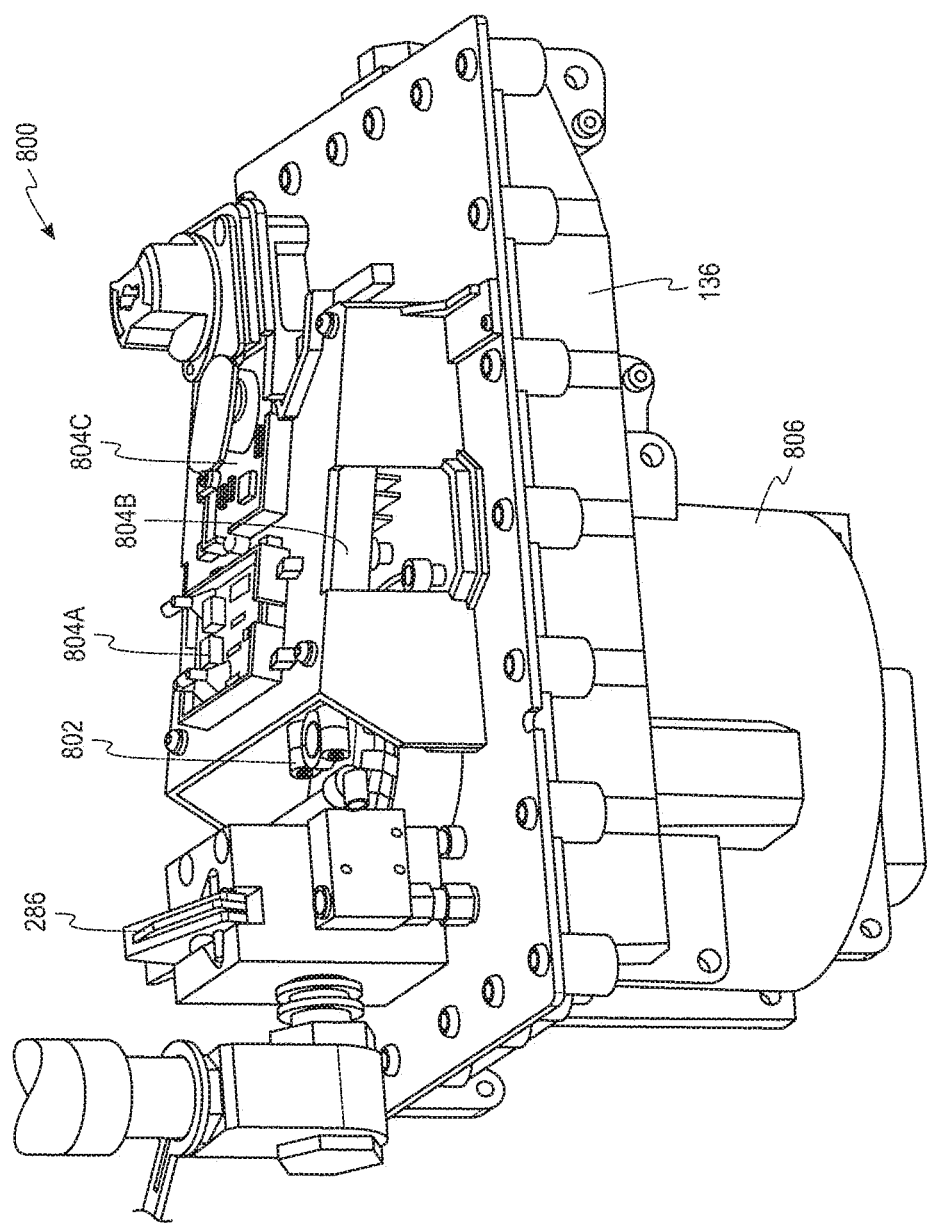
FIG. 8 illustrates a perspective view of an interior of a hydraulic pump according to an example embodiment.

FIG. 8 depicts a perspective view of a portion of the enclosed space 800 defined by the housing 792 (i.e., with the housing 792 omitted for ease of description) according to an example embodiment. As shown in FIG. 8, the enclosed space 800 includes a case 802 for the electric motor 128, a plurality of printed circuit board assemblies (PCBAs) 804A-804C, the hydraulic fluid tank 136, a case 806 for components of the hydraulic circuit 134, and the release valve 286. In an example, the plurality of PCBAs 804A-804C includes a solid state disconnect (SSD) PCBA 804A, a control PCBA 804B, a One-Key PCBA 806C, and a user interface PCBA 804D (shown in FIG. 6).

The SSD PCBA 804A operates based on control signals from the pump controller 140 to provide and remove bus power to an electronic circuit that drives the electric motor 128 (i.e., an electronic circuit between the battery 138 and the electric motor 128).

The user interface PCBA 804D can process user inputs received via the user interface 147 and cause the user interface 147 to display indicators based upon the user inputs. The user interface PCBA 804D can also communicate to the control PCBA 804B.

The control PCBA 804B can include the electronic circuit for operating the electric motor 128 (e.g., the circuitry between the electric motor 128 and the battery 138). The control PCBA 804B can also include control circuitry for controlling the operation of the electric motor 128 based on (i) user inputs received via the remote controller 114, (ii) the user inputs received via the user interface 147, and/or (iii) sensor signals related to sensed pressure levels in the hydraulic circuit 134 (e.g., sensor signals from the pressure transducer 146).

Within examples, the control PCBA 804B can be implemented using hardware, software, and/or firmware. For example, the control PCBA 804B can include one or more processors and a memory (i.e., a non-transitory computer readable medium (e.g., volatile and/or non-volatile memory)) that stores machine language instructions or other executable instructions. The instructions, when executed by the one or more processors, may cause control the PCBA 804B to carry out the various operations described herein.

The One-Key PCBA 806C can include circuitry for communicating with external devices such as, for instance, an application on a mobile device. Within examples, the One-Key PCBA 806C can communicate with such external devices to facilitate, for instance, data logging, service information, tracking, and/or security functions. The One-Key PCBA 806C can also be configured to carry out a wireless communication protocol for wireless operations of the hydraulic power tool system 100 (e.g., including wireless communications between the remote controller 114 and the hydraulic pump 110).

Figure 9A:
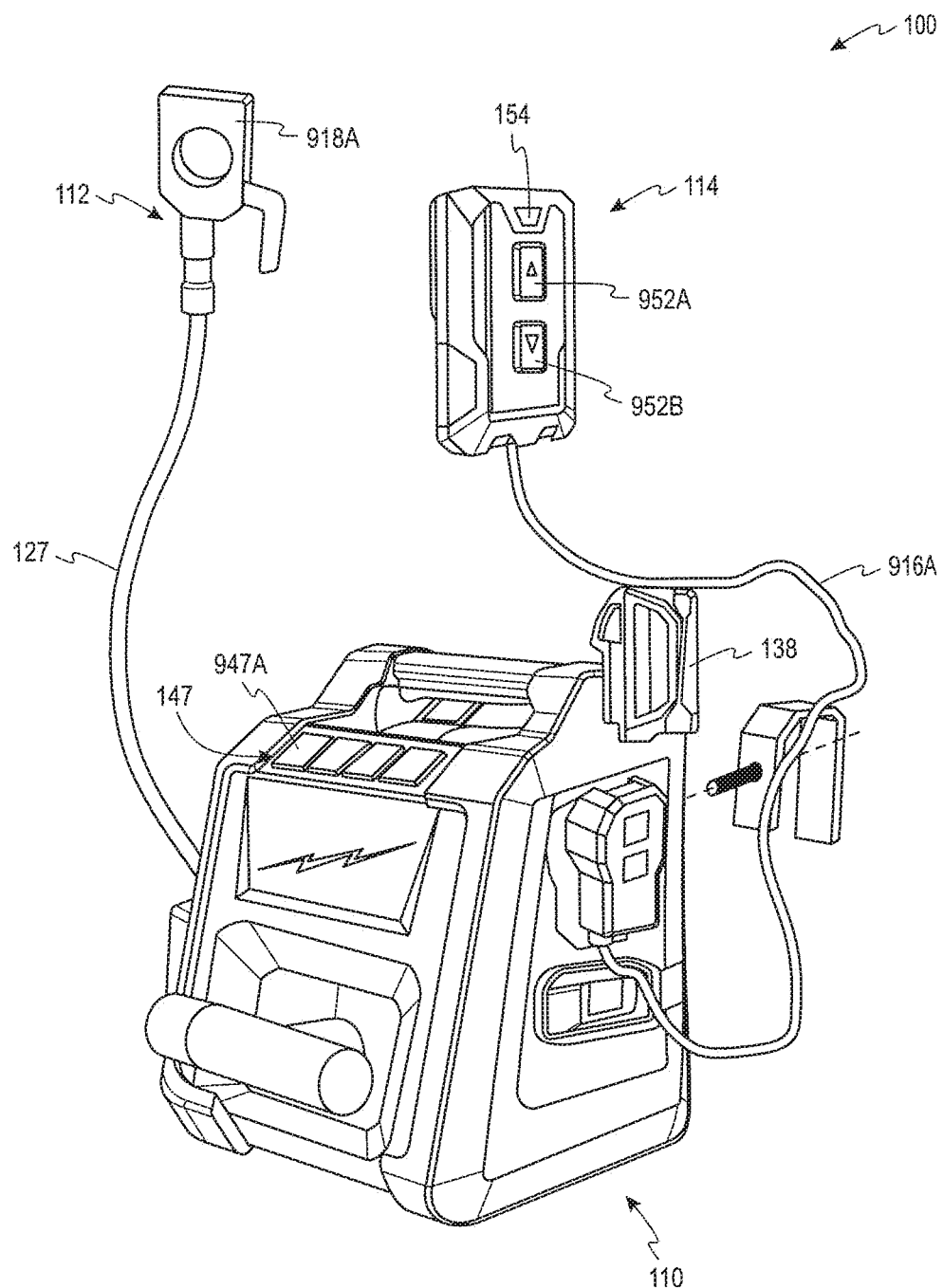
FIG. 9A illustrates a perspective view of a hydraulic power tool system configured for a first mode of operation according to an example embodiment.

FIGS. 9A-9D depict the hydraulic power tool system 100 configured in various modes of operation according to an example embodiment. FIG. 9A depicts the hydraulic power tool system 100 configured in a an auto-dump mode of operation. In this configuration, the fluid supply line 127 is coupled between the hydraulic pump 110 and a hydraulic tool 112. In FIG. 9A, the hydraulic tool 112 has a cutting head 918A; however, the hydraulic tool 112 can also be operated in the auto-dump mode with the hydraulic tool 112 having a crimping head (e.g., a crimping head 918B shown in FIG. 9B) within examples. As shown in FIG. 9A, the battery 138 can be coupled to the hydraulic pump 110 (and, thus, the electric motor 128 therein), and the remote controller 114 can be coupled to the hydraulic pump 110 via a pendant cable 916A (e.g., a wired communication link).

As shown in FIG. 9A, the operator can actuate a first button 947A on the user interface 147 to set the hydraulic pump 110 in the auto-dump mode. The operator can then press and hold a forward button 952A on the remote controller 114 until one of a plurality of outcomes occurs. As result of each of the following example outcomes, the pump controller 140 can record a cycle of the hydraulic power tool system 100.

A first outcome of the plurality of outcomes can include the pressure transducer 146 sensing that the fluid reached the second threshold pressure indicating that the operation (e.g., the cut/crimp operation) was completed, and the hydraulic pump 110 can automatically operate to release the fluid pressure in the hydraulic tool 112. Responsive to the first outcome, the pump controller 140 can cause a first indicator light of the output device 154 on the remote controller 114 to illuminate. The first indicator light can be, for example, a light-emitting diode of a first color (e.g., a green light).

A second outcome of the plurality of outcomes can result when the operator releases the forward button 952A before the pressure transducer 146 senses that the pressure of the fluid is greater than the second threshold pressure (i.e., the cut is complete but without reaching full pressure). Responsive to the second outcome, the hydraulic pump 110 can operate to maintain the fluid in the hydraulic tool 112 at a constant pressure (i.e., at the pressure of the fluid at the time the operator released the forward button 952A).

The pump controller 140 can also cause a second indicator light on the remote controller 114 to blink. The second indicator light can be, for example, a LED of a second color (e.g., a red light). This can prompt the operator to actuate the release button 952B on the remote controller 114 to release the pressure of the fluid in the hydraulic tool 112 and return the jaws 120 to the home position. For instance, responsive to the operator actuating the release button 952B, the pump controller 140 can cause the electric motor 128 to rotate in the second rotational direction and open the shear seal valve 264, as described above.

A third outcome of the plurality of outcomes can result when the fluid does not reach the second threshold pressure, and the cut is not completed. The third outcome can also include the hydraulic pump automatically operating to release the fluid pressure in the hydraulic tool 112. Responsive to the third outcome, the pump controller 140 can cause the second indicator light on the remote controller 114 to illuminate.

In one example, the third outcome may occur when the operator releases the forward button 952A prior to completion of the operation (i.e., prior to the fluid reaching the second threshold pressure). In another example, the third outcome can occur when the operator releases the forward button 952A prior to the fluid reaching a fourth threshold pressure, whereas the first outcome can occur when the operator releases the forward button 952A after the fluid reaches the fourth threshold pressure. For instance, the pressure transducer 146 can sense a pressure level of the fluid at one or more locations in the hydraulic circuit 134 (e.g., the pressure level of the fluid at the fluid supply line 127), and generate a signal indicative of the sensed pressure level being greater than the fourth threshold pressure. In general, the fourth threshold pressure can be less than the second threshold pressure.

In this arrangement, if the operator releases the forward button 952A before the pressure transducer 146 senses that the fluid reached the fourth threshold pressure, the third outcome can occur as described above. Otherwise, when the pressure transducer 146 senses that the fluid reaches the fourth threshold pressure, the electric motor 128 can continue to run until the fluid reaches the second threshold pressure (regardless of whether the operator then releases the forward button 952A on the remote controller 114 before the fluid reaches the second threshold pressure). Responsive to the fluid reaching the second threshold pressure, the first outcome can occur as described above.

Figure 9B:
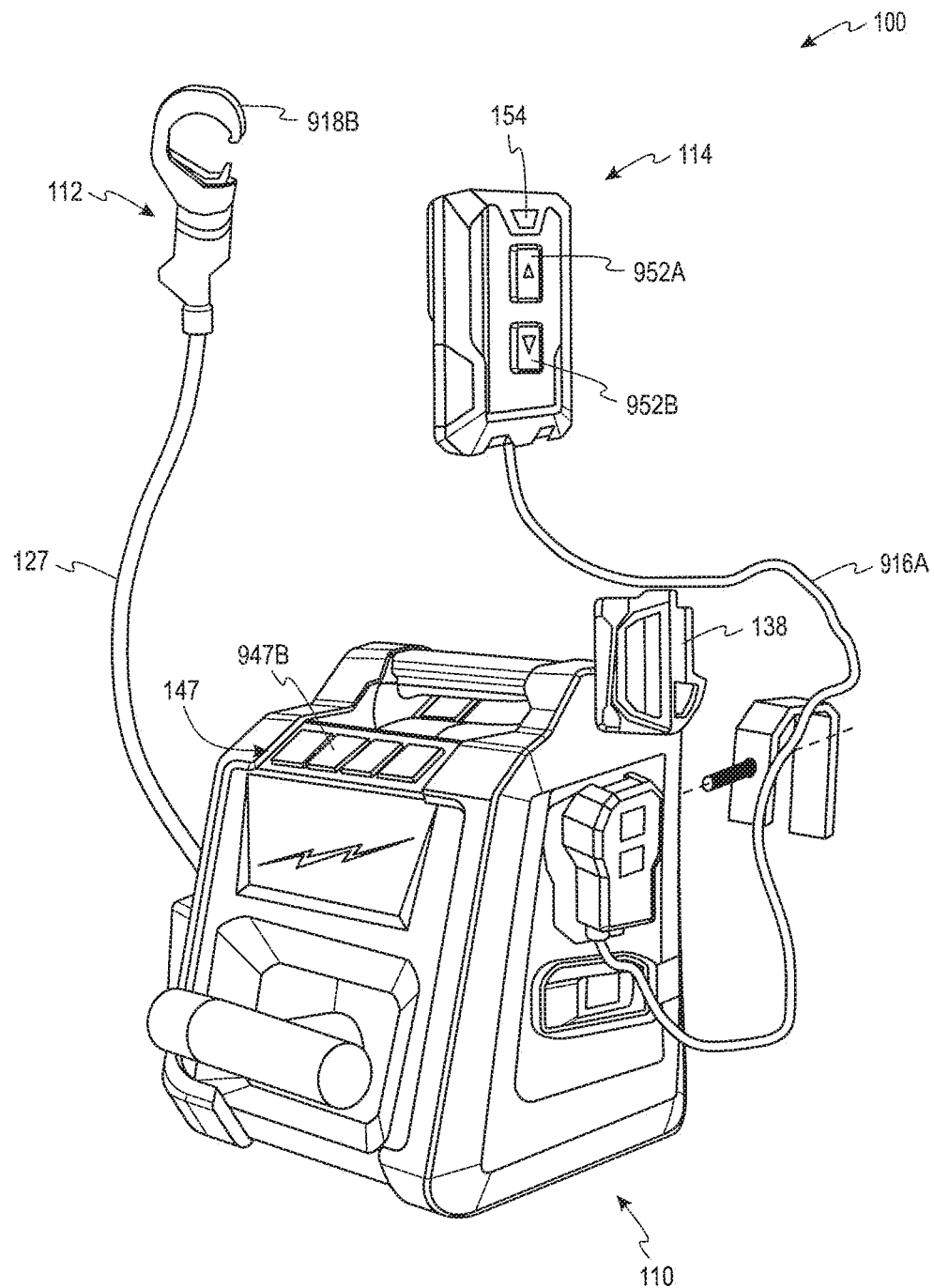
FIG. 9B illustrates a perspective view of a hydraulic power tool system configured for a second mode of operation according to an example embodiment.

FIG. 9B depicts the hydraulic power tool system 100 configured in a pressure-hold mode of operation. In this configuration, the fluid supply line 127 is coupled between the hydraulic pump 110 and a hydraulic tool 112. In FIG. 9B, the hydraulic tool 112 has a crimping head 918B; however, the hydraulic tool 112 can also be operated in the pressure-hold mode with the hydraulic tool 112 having a cutting head (e.g., the cutting head 918A shown in FIG. 9A), a lifting cylinder for a hydraulic lift, and/or a pipe bender within examples. As shown in FIG. 9B, the battery 138 can be coupled to the hydraulic pump 110 (and, thus, the electric motor 128 therein), and the remote controller 114 can be coupled to the hydraulic pump 110 via a pendant cable 916A (e.g., a wired communication link).

As shown in FIG. 9B, the operator can actuate a second button 947B on the user interface 147 to set the hydraulic pump 110 in the pressure-hold mode. The operator can then press and hold the forward button 952A on the remote controller 114 until one of a plurality of outcomes occurs. As result of each of the following example outcomes, the pump controller 140 can record a cycle of the hydraulic power tool system 100.

A first outcome of the plurality of outcomes can include the pressure transducer 146 sensing that the fluid reached the second threshold pressure indicating that the operation was completed. The hydraulic pump 110 can operate to maintain the fluid pressure in the hydraulic tool 112 (e.g., maintain the fluid pressure at the second threshold pressure). Responsive to the first outcome, the pump controller 140 can cause the first indicator light of the output device 154 on the remote controller 114 to illuminate.

A second outcome of the plurality of outcomes can result when the operator releases the forward button 952A before the pressure transducer 146 senses that the pressure of the fluid is greater than the second threshold pressure. This may occur, for instance, when the operator jogs the jaws 120 towards one another during a crimp operation, the operator partially raises a hydraulic lift, and/or partially bends a workpiece in a pipe bender. Responsive to the second outcome, the hydraulic pump 110 can operate to maintain the fluid in the hydraulic tool 112 at a constant pressure (i.e., at the pressure of the fluid at the time the operator released the forward button 952A). The pump controller 140 can also cause the second indicator light on the remote controller 114 to blink. This can prompt the operator to press and hold the forward button 952A to continue the pressure-hold operation.

A third outcome of the plurality of outcomes can result when the fluid does not reach the second threshold pressure, and the operation is not completed. The third outcome can also include operating the hydraulic pump 110 to maintain the fluid pressure in the hydraulic tool 112. Responsive to the third outcome, the pump controller 140 can cause the second indicator light on the remote controller 114 to illuminate.

In the pressure-hold mode of operation, when the operator actuates the release button 952B (responsive to the first outcome, the second outcome, and/or the third outcome), the hydraulic pump 110 can operate to release the fluid pressure in the hydraulic tool 112 and retract the jaws 120 back to the home position.

Figure 9C:
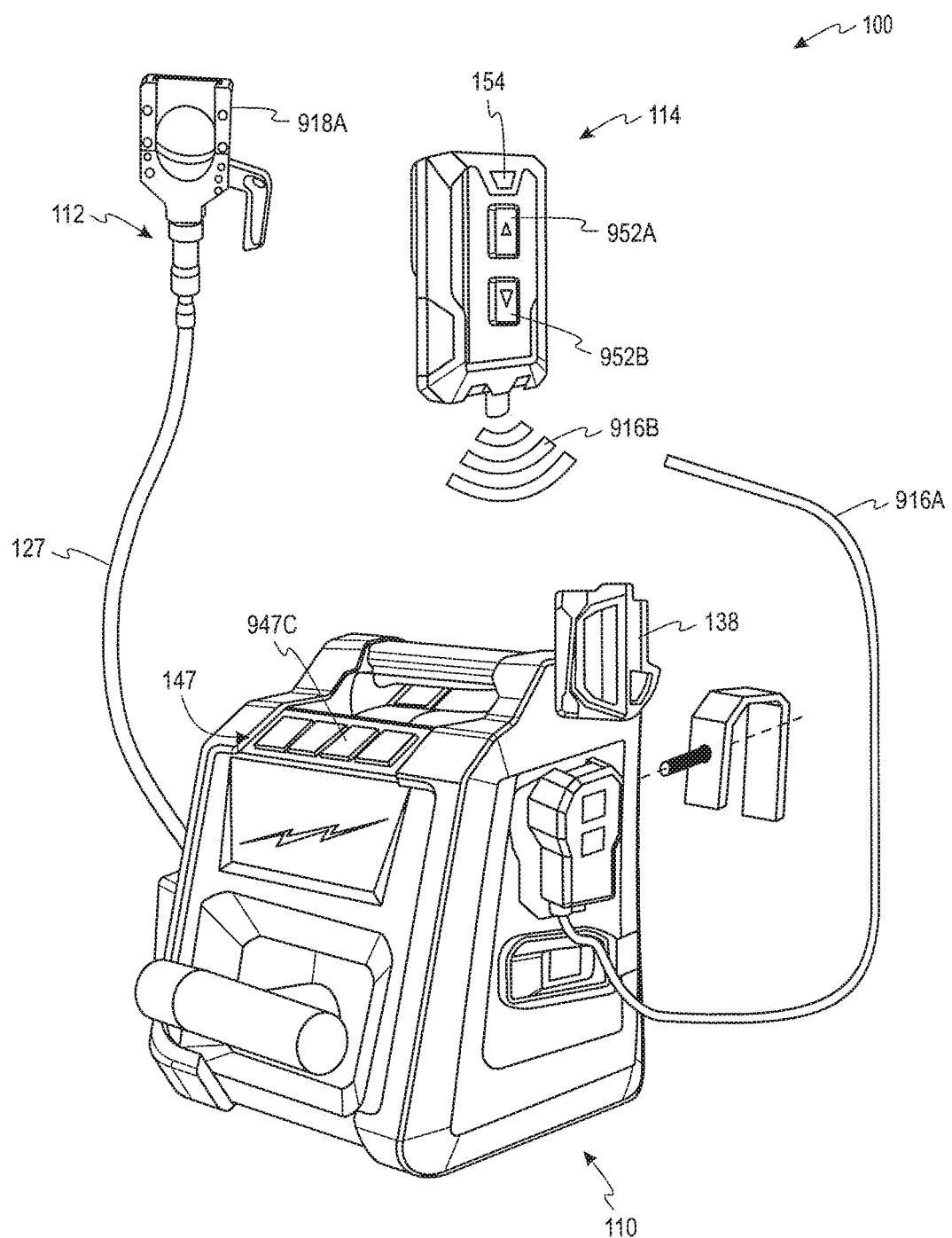
FIG. 9C illustrates a perspective view of a hydraulic power tool system configured for a third mode of operation according to an example embodiment.

FIGS. 9C-9F depict the hydraulic power tool system 100 configured in a wireless cutting/spearing mode of operation. In this configuration, the fluid supply line 127 is coupled between the hydraulic pump 110 and the hydraulic tool 112 having the cutting head 918A. As shown in FIG. 9C, the battery 138 can be coupled to the hydraulic pump 110 (and, thus, the electric motor 128 therein).

Figure 9D:
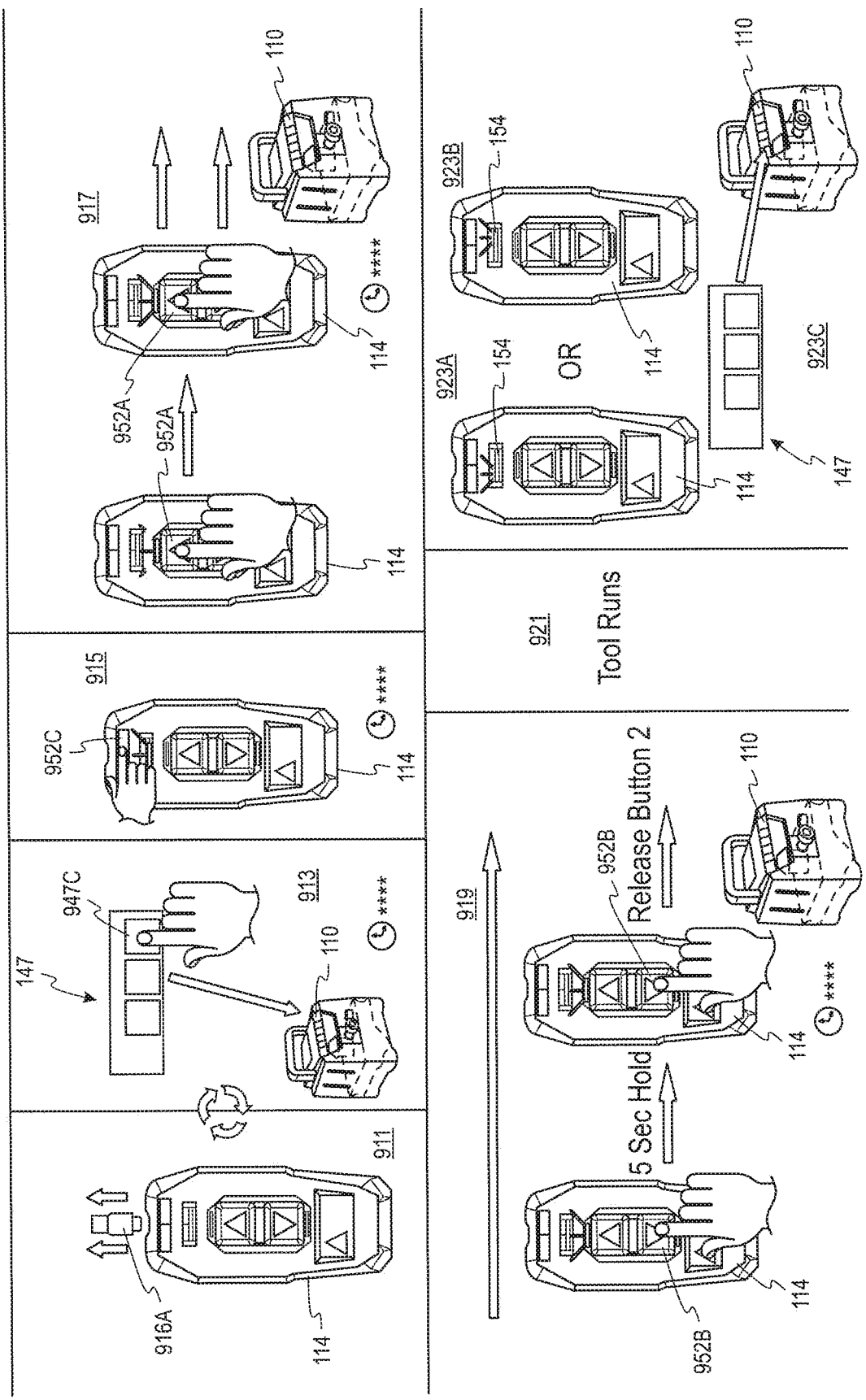
FIG. 9D illustrates a process for operating the hydraulic power tool system in a third mode of operation according to an example embodiment.
Figure 9E:
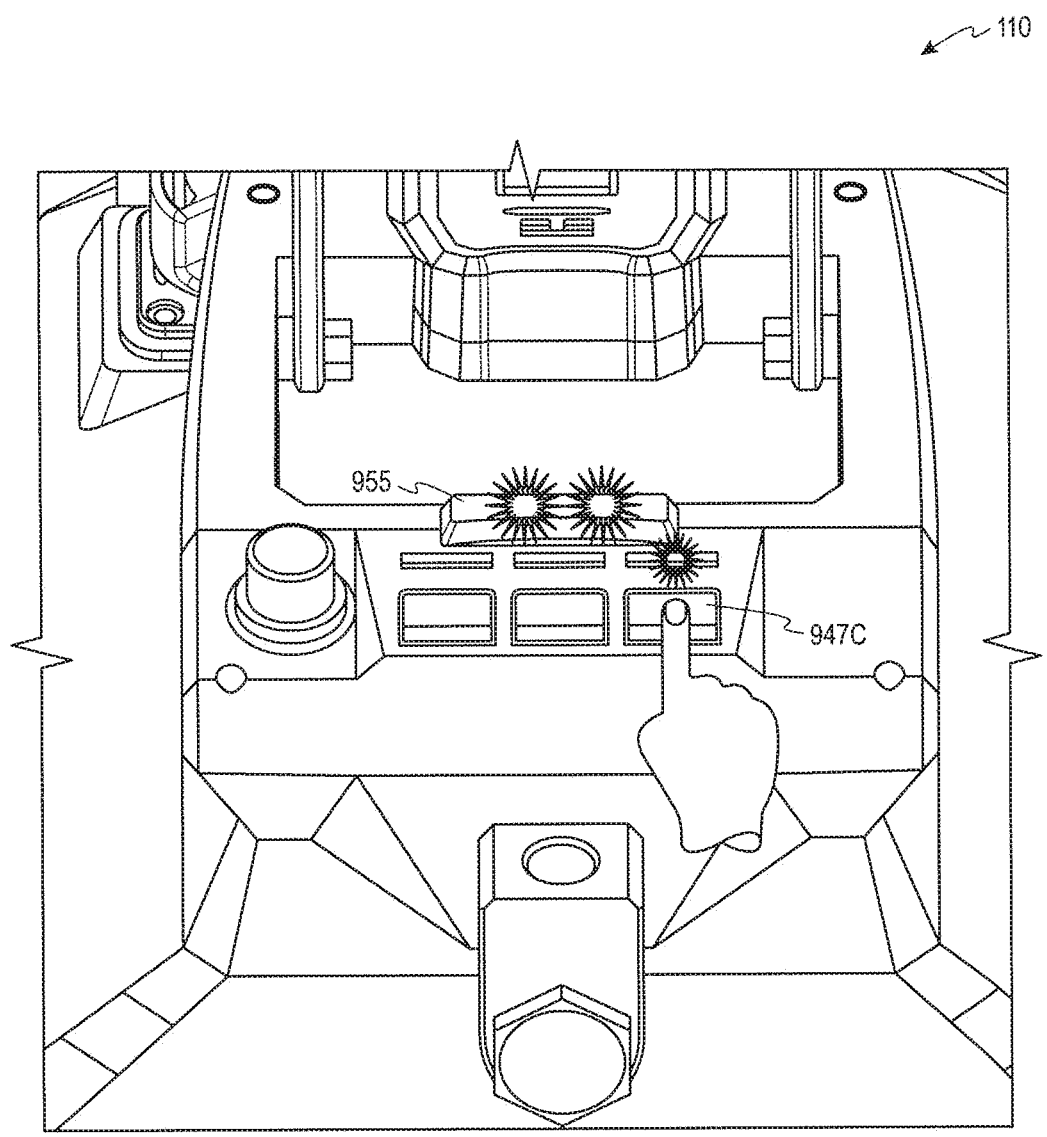
FIG. 9E illustrates a partial front side view of a hydraulic pump configured for the third mode of operation according to an example embodiment.

As shown in FIG. 9D, at step 911, the remote controller 114 can be decoupled from the pendant cable 916A. As shown in FIG. 9C and at step 913 in FIG. 9D, the operator can actuate a third button 947C on the user interface 147 to set the hydraulic pump 110 in the wireless cutting/spearing mode of operation. As shown in FIG. 9E, responsive to the operator actuating the third button 947C, one or more indicator lights 955 of the user interface 147 can start flashing. As shown in FIG. 9D, at step 915, the operator can turn on the remote controller 114 by actuating a power button 952C on the remote controller 114. As shown in FIG. 9C, the remote controller 114 can communicatively couple to the hydraulic pump 110 via a wireless communication link 916B.

At step 917 of FIG. 9D, the operator can press and hold the forward button 952A on the remote controller 114 for a first period of time (e.g., approximately three seconds and/or approximately five seconds). After the first period of time expires, the operator can release the forward button 952A, and the hydraulic pump 110 can responsively initiate a timer for a second period of time (e.g., approximately 20 seconds). As shown at step 919, before the timer expires, the operator can press and hold the release button 952B for at least a third period of time (e.g., approximately three seconds and/or approximately five seconds) and then release the release button 952B. Responsive to the operator completing the operations at step 919 prior to the timer expiring, the hydraulic pump 110 operates to supply the pressurized fluid to the hydraulic tool 112 (at step 921 in FIG. 9D) until one of a plurality of outcomes results. As a result of each of the following example outcomes, the pump controller 140 can record a cycle of the hydraulic power tool system 100.

A first outcome of the plurality of outcomes (shown in step 923A of FIG. 9D) can include the pressure transducer 146 sensing that the fluid reached the second threshold pressure indicating that the cut operation was completed, and the hydraulic pump 110 can automatically operate to release the fluid pressure in the hydraulic tool 112. Responsive to the first outcome, the pump controller 140 can cause the first indicator light of the output device 154 on the remote controller 114 to illuminate.

A second outcome of the plurality of outcomes (shown in step 923B of FIG. 9D) can result when the fluid does not reach the second threshold pressure, and the cut is not completed. The second outcome can also include the hydraulic pump automatically operating to release the fluid pressure in the hydraulic tool 112. Responsive to the second outcome, the pump controller 140 can cause the second indicator light on the remote controller 114 to illuminate.

As shown in step 923C of FIG. 9D, the hydraulic pump 110 can automatically transition to the auto-dump mode after the first outcome and/or the second outcome.

Figure 9F:
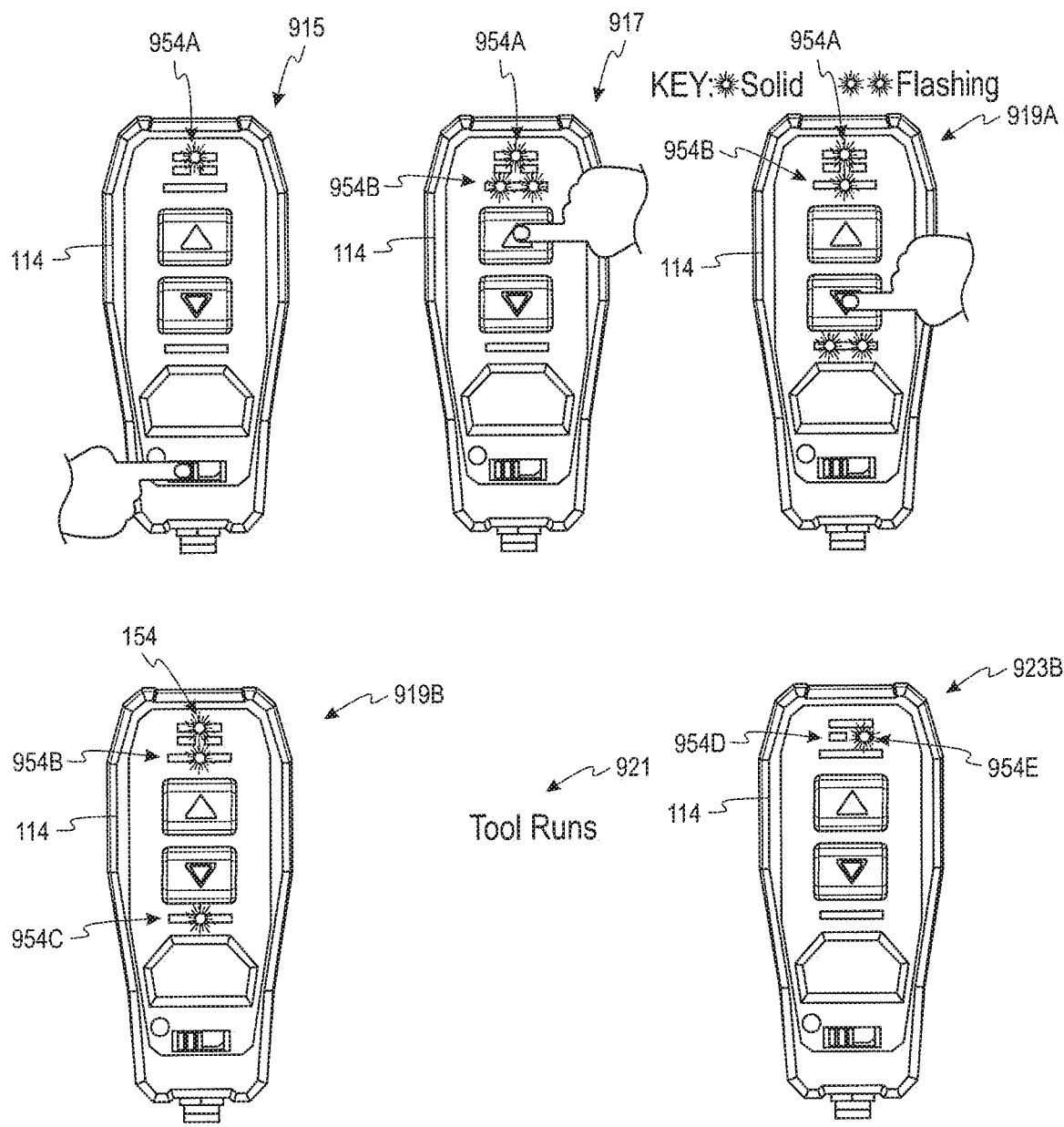
FIG. 9F illustrates a remote controller and a plurality of stages of a process for operating the hydraulic power tool system in the third mode of operation according to an example embodiment.

Referring to FIG. 9F, the remote controller 114 is illustrated for select steps shown in FIG. 9D to show example indicator signals that can be provided by the remote controller 114 at the select steps of the process, according to an example embodiment. As shown in FIG. 9F, at step 915, when the remote controller 114 is decoupled from the pendant cable 916A and powered on, a first indicator light 954A (e.g., a blue LED) can initially flash and then become solid when wireless communication between the remote controller 114 and the pump controller 140 is established.

In FIG. 9F, at step 917, when the operator presses and holds the forward button 952A on the remote controller 114, the first indicator light 954A will start to flash. Then once the operator has held the forward button 952A for at least the first period of time, the first indicator light 954A can become solid and a second indicator light 954B can begin to flash.

In FIG. 9F, at step 919A, when the operator presses and holds the release button 952B, the second indicator light 954B can become solid and a third indicator light 954C can start to flash. At step 919B, after the operator releases the release button 952B, the first indicator light 954A, the second indicator light 954B, and the third indicator light 954C can all be solid. At step 921 in FIG. 9F, the hydraulic pump 110 operates to supply the pressurized fluid to the hydraulic tool 112 as described above. Then, at step 923A (not shown in FIG. 9F) or step 923B (shown in FIG. 9F), a fourth indicator light 954D or a fifth indicator light 954E can illuminate to indicate whether the operation was successful or a failure, as described above.

Figure 10:
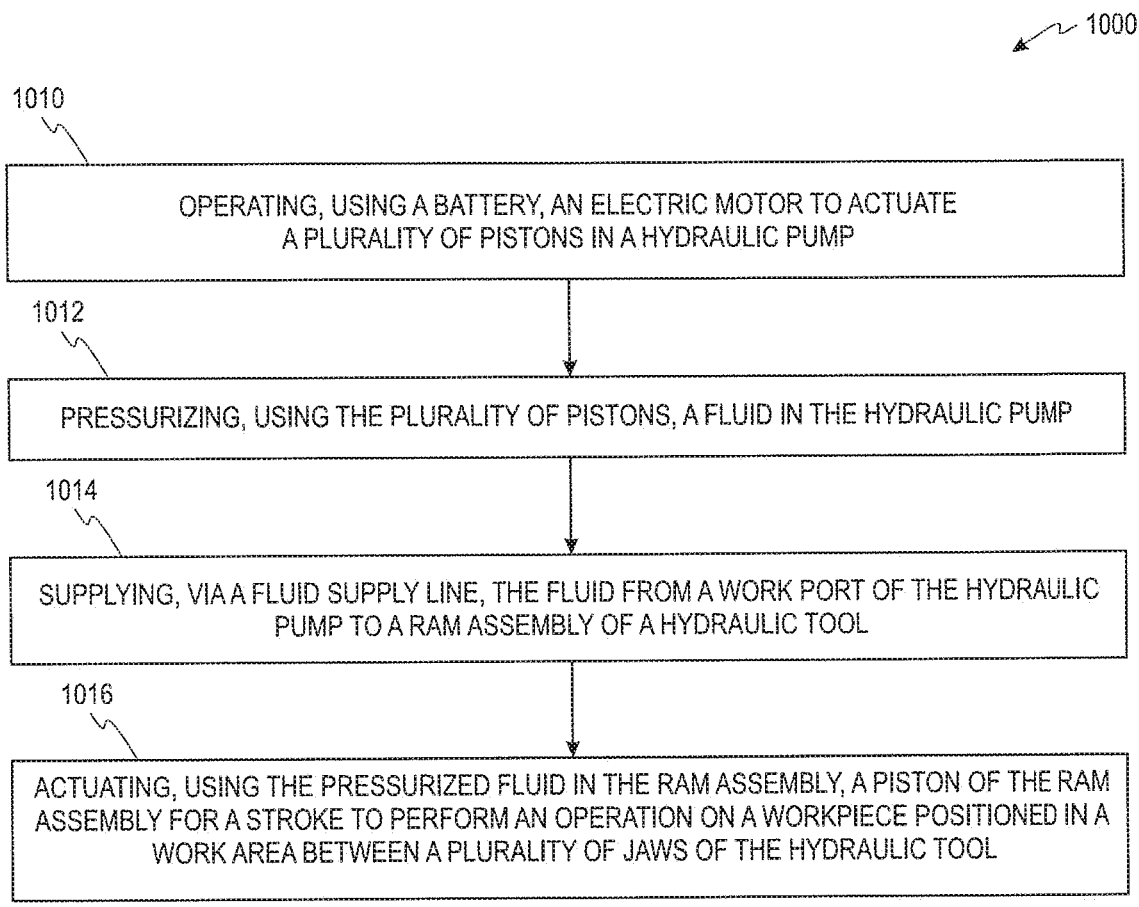
FIG. 10 illustrates a flowchart for a process of operating a hydraulic power tool system according to an example embodiment.

Referring now to FIG. 10, a flowchart for a process 1000 of operating a hydraulic power tool system is illustrated according to an example embodiment. As shown in FIG. 10, at block 1010, the process 1000 includes operating, using a battery, an electric motor to actuate a plurality of pistons in a hydraulic pump. At block 1012, the process 1000 includes pressurizing, using the plurality of pistons, a fluid in the hydraulic pump. At block 1014, the process 1000 further includes supplying, via a fluid supply line, the fluid from a work port of the hydraulic pump to a ram assembly of a hydraulic tool. At block 1016, the process 1000 includes actuating, using the pressurized fluid in the ram assembly, a piston of the ram assembly for a stroke to perform an operation on a workpiece positioned in a work area between a plurality of jaws of the hydraulic tool.

Figure 11:
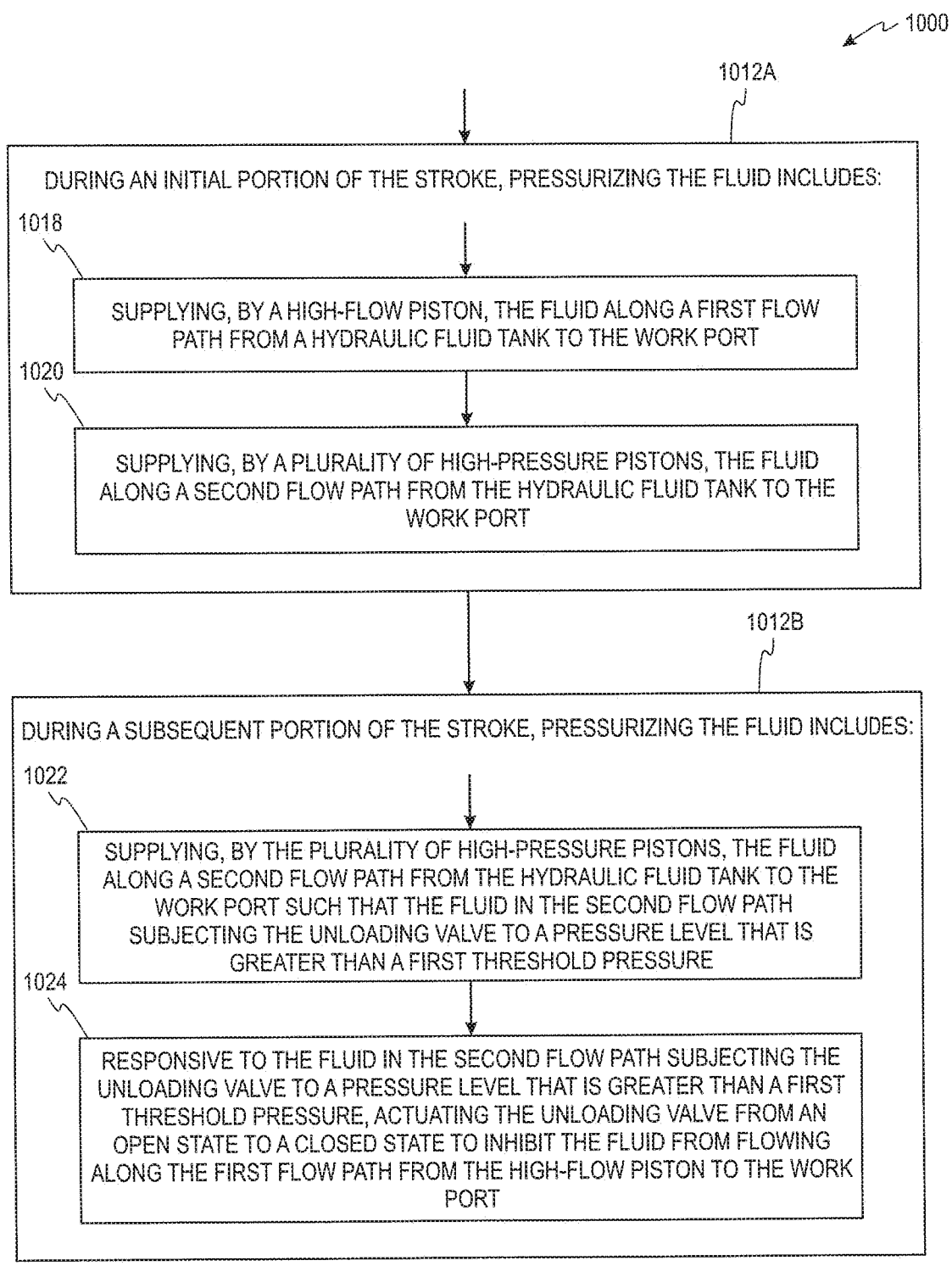
FIG. 11 illustrates another flowchart for a process of operating a hydraulic power tool system that can be used with the process shown in FIG. 10.

FIG. 11 depicts additional aspects of the process 1000 according to further examples. As shown in FIG. 11, the process 1000 can include pressurizing the fluid at block 1012 by performing the steps indicated at block 1012A during an initial portion of the stroke, and performing the steps indicated at block 1012B during a subsequent portion of the stroke.

At block 1012A, during the initial portion of the stroke, pressurizing the fluid from the hydraulic fluid tank includes: (i) supplying, by a high-flow piston, the fluid along a first flow path from a hydraulic fluid tank to the work port at block 1018, and (ii) supplying, by a plurality of high-pressure pistons, the fluid along a second flow path from the hydraulic fluid tank to the work port. The first flow path includes an unloading valve between the high-flow piston and the work port at block 1020.

At block 1012B, during the subsequent portion of the stroke, pressurizing the fluid from the hydraulic fluid tank includes: (iii) supplying, by the plurality of high-pressure pistons, the fluid along a second flow path from the hydraulic fluid tank to the work port such that the fluid in the second flow path subjecting the unloading valve to a pressure level that is greater than a first threshold pressure at block 1022, and (iv) responsive to the fluid in the second flow path subjecting the unloading valve to a pressure level that is greater than a first threshold pressure, actuating the unloading valve from an open state to a closed state to inhibit the fluid from flowing along the first flow path from the high-flow piston to the work port at block 1024.

Figure 12:
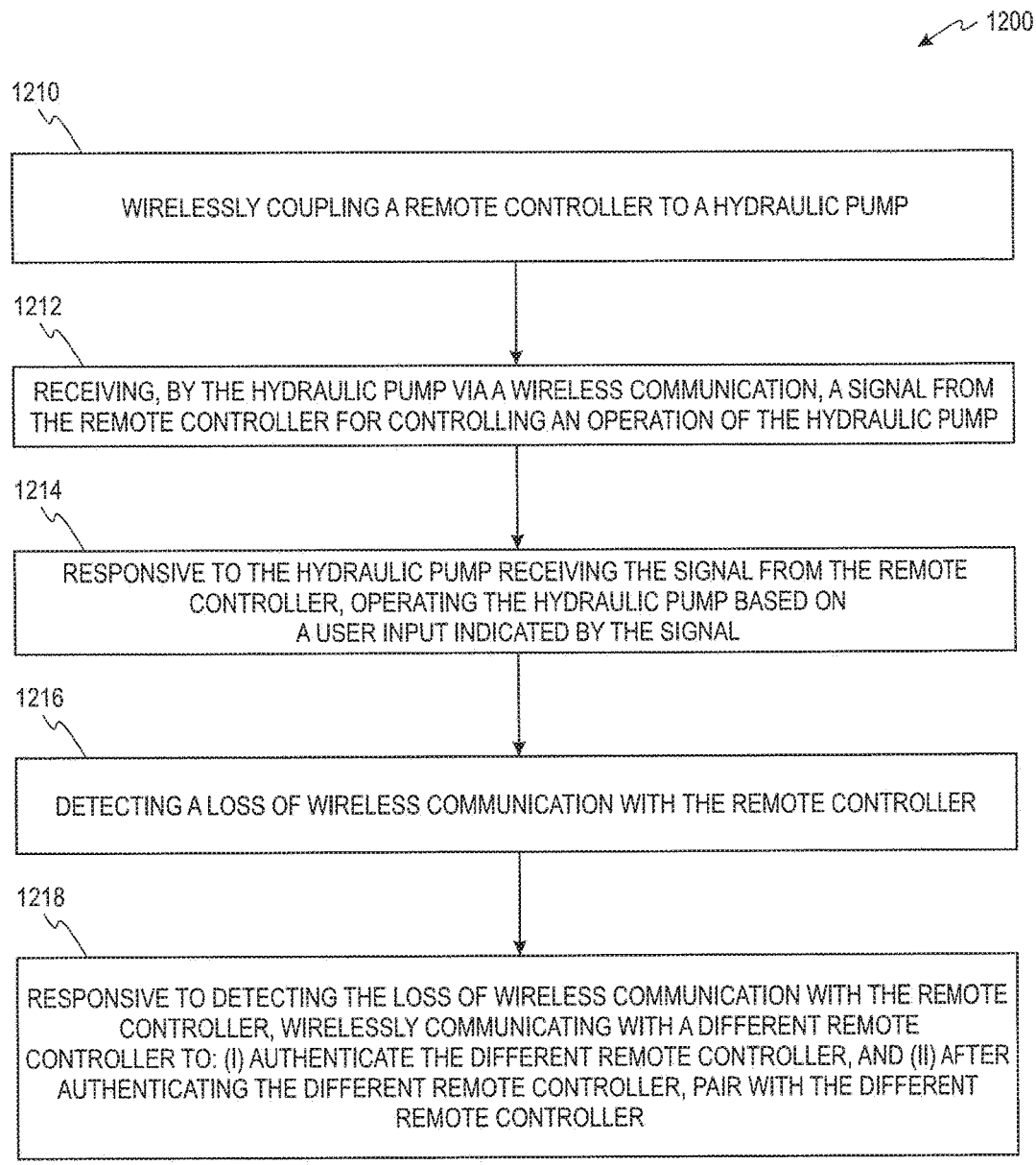
FIG. 12 illustrates a flowchart for a process of operating a hydraulic power tool system according to an example embodiment.

Referring now to FIG. 12, a flowchart for a process 1200 of operating a hydraulic pump is illustrated according to an example embodiment. As shown in FIG. 12, at block 1210, the process 1200 can include wirelessly coupling a remote controller to a hydraulic pump. At block 1212, the process 1200 includes receiving, by the hydraulic pump via a wireless communication, a signal from the remote controller for controlling an operation of the hydraulic pump. At block 1214, responsive to the hydraulic pump receiving the signal from the remote controller, the process 1200 includes operating the hydraulic pump based on a user input indicated by the signal.

At block 1216, the process 1200 includes detecting a loss of wireless communication with the remote controller. Responsive to detecting the loss of wireless communication with the remote controller at block 1216, the process 1200 includes wirelessly communicating with a different remote controller to: (i) authenticate the different remote controller, and (ii) after authenticating the different remote controller, pair with the different remote controller at block 1218.

One or more of the blocks shown in FIGS. 10-12 may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), NAND-based flash storage and/or NOR-based flash storage, for example. The computer readable media may also be any other volatile or non-volatile storage systems. The computer readable medium may be considered a tangible computer readable storage medium, for example.

What is claimed is:

1. A hydraulic pump, comprising:
   a work port configured to couple to a fluid supply line of a hydraulic tool;
   a high-flow piston configured to supply fluid along a first flow path to the work port;
   a plurality of high-pressure pistons configured to supply the fluid along a second flow path to the work port; and
   an unloading valve fluidly coupled to the first flow path and the second flow path, wherein the unloading valve is actuatable between an open state and a closed state, wherein the unloading valve is configured to permit the fluid to flow from the high-flow piston to the work port in the open state, wherein the unloading valve is configured to inhibit the fluid from flowing from the high-flow piston to the work port in the closed state, wherein the unloading valve is configured to actuate from the open state to the closed state when a pressure level of the fluid in the second flow path exceeds a first threshold pressure,
   wherein the unloading valve comprises:
      a first chamber fluidly coupled to the first flow path;
      a movable ball disposed in the first chamber;
      a second chamber comprising a plunger configured to move the movable ball from a seated position to an unseated position, wherein the second chamber is fluidly coupled to a hydraulic fluid tank, and wherein the plunger is configured to be subjected to the fluid in the second flow path; and
      a spring in the first chamber and biasing the movable ball toward the seated position at which the movable ball is configured to block fluid communication between the first chamber and the second chamber,
      wherein when the pressure level of the fluid in the second flow path exceeds the first threshold pressure, the plunger applies a force to the movable ball that overcomes a biasing force of the spring and moves the movable ball to the unseated position, and
      wherein when the movable ball is in the unseated position, the first chamber is fluidly coupled to the hydraulic fluid tank via the second chamber.

2. The hydraulic pump of claim 1, further comprising:
   a pressure transducer configured to sense a pressure level of the fluid supplied to the work port and generate a signal indicative of the sensed pressure level being greater than a second threshold pressure; and
   a shear seal valve configured to, responsive to the signal from the pressure transducer indicating that the sensed pressure level is greater than the second threshold pressure, fluidly couple the second flow path to a hydraulic fluid tank,
   wherein the second threshold pressure is related to an end of an operation of the hydraulic tool.

3. The hydraulic pump of claim 2, further comprising a relief valve configured to return the fluid to the hydraulic fluid tank when the fluid applies a pressure on the relief valve that is greater than a third threshold pressure, wherein the third threshold pressure is greater than the second threshold pressure.

4. The hydraulic pump of claim 2, further comprising a release valve that is manually actuatable to return the fluid along a return flow path from the work port to the hydraulic fluid tank.

5. A hydraulic pump, comprising:
   a work port configured to couple to a fluid supply line of a hydraulic tool;
   a high-flow piston configured to supply fluid along a first flow path to the work port;
   a plurality of high-pressure pistons configured to supply the fluid along a second flow path to the work port;
   an unloading valve fluidly coupled to the first flow path and the second flow path, wherein the unloading valve is actuatable between an open state and a closed state, wherein the unloading valve is configured to permit the fluid to flow from the high-flow piston to the work port in the open state, wherein the unloading valve is configured to inhibit the fluid from flowing from the high-flow piston to the work port in the closed state, wherein the unloading valve is configured to actuate from the open state to the closed state when a pressure level of the fluid in the second flow path exceeds a first threshold pressure;
   a pressure transducer configured to sense a pressure level of the fluid supplied to the work port and generate a signal indicative of the sensed pressure level being greater than a second threshold pressure;
   a shear seal valve configured to, responsive to the signal from the pressure transducer indicating that the sensed pressure level is greater than the second threshold pressure, fluidly couple the second flow path to a hydraulic fluid tank,
   wherein the second threshold pressure is related to an end of an operation of the hydraulic tool; and
   a dump valve having a movable element including (i) a first surface configured to be subjected to the fluid in the second flow path, and (ii) a second surface configured to be subjected to the fluid in a return flow path between the work port and the dump valve,
   wherein the movable element is configured to move from a first position to a second position responsive to a fluid pressure differential between the fluid at the second surface and the fluid at the first surface being greater than a threshold pressure differential, wherein, when the movable element is in the first position, the dump valve is configured to fluidly decouple the return flow path from the hydraulic fluid tank, and wherein, when the movable element is in the second position, the dump valve is configured to fluidly couple the return flow path to the hydraulic fluid tank.

6. The hydraulic pump of claim 5, further comprising a bucket hanger feature configured to hang the hydraulic pump on a picker bucket.

7. A system, comprising:
a hydraulic pump comprising:
- a work port configured to couple to a fluid supply line of a hydraulic tool,
- a hydraulic fluid tank configured to store a fluid,
- a high-flow piston configured to supply the fluid along a first flow path from the hydraulic fluid tank to the work port,
- a plurality of high-pressure pistons configured to supply the fluid along a second flow path from the hydraulic fluid tank to the work port,
- an unloading valve along the first flow path, wherein the unloading valve is actuatable between an open state and a closed state, wherein the unloading valve is configured to permit the fluid to flow from the high-flow piston to the work port in the open state, wherein the unloading valve is configured to inhibit the fluid from flowing from the high-flow piston to the work port in the closed state, wherein the unloading valve is configured to actuate from the open state to the closed state when a pressure level of the fluid in the second flow path exceeds a first threshold pressure,
- an electric motor configured to convert electrical energy into rotational motion, and
- a mechanical transducer operably coupled to the electric motor, the high-flow piston, and the plurality of high-pressure pistons, wherein the mechanical transducer is configured to convert the rotational motion of the electric motor into a linear motion of the high-flow piston and the plurality of high-pressure pistons; and a remote controller in communication with the hydraulic pump and configured to control operation of the hydraulic pump,
wherein the remote controller is configured to:
receive a user input selecting a mode of operation for the hydraulic pump, and
responsive to the user input, communicate the mode of operation to the hydraulic pump to cause the hydraulic pump to set the first threshold pressure to a value corresponding to the mode of operation.

8. The system of claim 7, wherein the hydraulic pump is configured to:
detect a loss of wireless communication with the remote controller, and
responsive to detecting the loss of wireless communication with the remote controller, wirelessly communicate with a different remote controller to:
(i) authenticate the different remote controller, and
(ii) after authenticating the different remote controller, pair with the different remote controller.

\* \* \* \* \*